(12) United States Patent
Xhafa et al.

(10) Patent No.: US 7,826,459 B2
(45) Date of Patent: Nov. 2, 2010

(54) COEXISTENCE OF DIFFERENT NETWORK TECHNOLOGIES

(75) Inventors: Ariton E. Xhafa, Plano, TX (US); Xiaolin Lu, Plano, TX (US); Henry S. Eilts, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 143 days.

(21) Appl. No.: 12/189,715

(22) Filed: Aug. 11, 2008

(65) Prior Publication Data

US 2009/0040937 A1    Feb. 12, 2009

Related U.S. Application Data

(60) Provisional application No. 60/955,108, filed on Aug. 10, 2007, provisional application No. 60/992,400, filed on Dec. 5, 2007.

(51) Int. Cl.
*H04L 12/28* (2006.01)

(52) U.S. Cl. .................... 370/395.5; 370/252

(58) Field of Classification Search ............... 370/328, 370/338, 395.5, 432.1, 432.2, 432.3, 433, 370/452.2, 466, 467; 455/80, 102, 552.1, 455/556.1
See application file for complete search history.

(56) References Cited

U.S. PATENT DOCUMENTS

| | | | | |
|---|---|---|---|---|
| 5,907,553 | A * | 5/1999 | Kelly et al. | 370/433 |
| 6,801,777 | B2 * | 10/2004 | Rusch | 455/452.2 |
| 7,010,270 | B1 * | 3/2006 | Thomas et al. | 455/67.13 |
| 2003/0124982 | A1 * | 7/2003 | Saari et al. | 455/67.4 |
| 2004/0076179 | A1 * | 4/2004 | Kaminski et al. | 370/466 |
| 2006/0068837 | A1 * | 3/2006 | Malone | 455/552.1 |
| 2006/0162778 | A1 * | 7/2006 | Nichols et al. | 137/204 |
| 2007/0076649 | A1 * | 4/2007 | Lin et al. | 370/328 |

* cited by examiner

*Primary Examiner*—Kwang B Yao
*Assistant Examiner*—Andrew Lai
(74) *Attorney, Agent, or Firm*—Steven A. Shaw; W. James Brady; Frederick J. Telecky, Jr.

(57) ABSTRACT

In at least some embodiments, a communication device includes a plurality of network technology subsystems, each subsystem associated with a different network technology. The communication device also includes a controller coupled to the plurality of network technology subsystems. The controller enables coexistence of the different network technologies in accordance with at least one monitored quality of service (QoS) parameter.

14 Claims, 31 Drawing Sheets

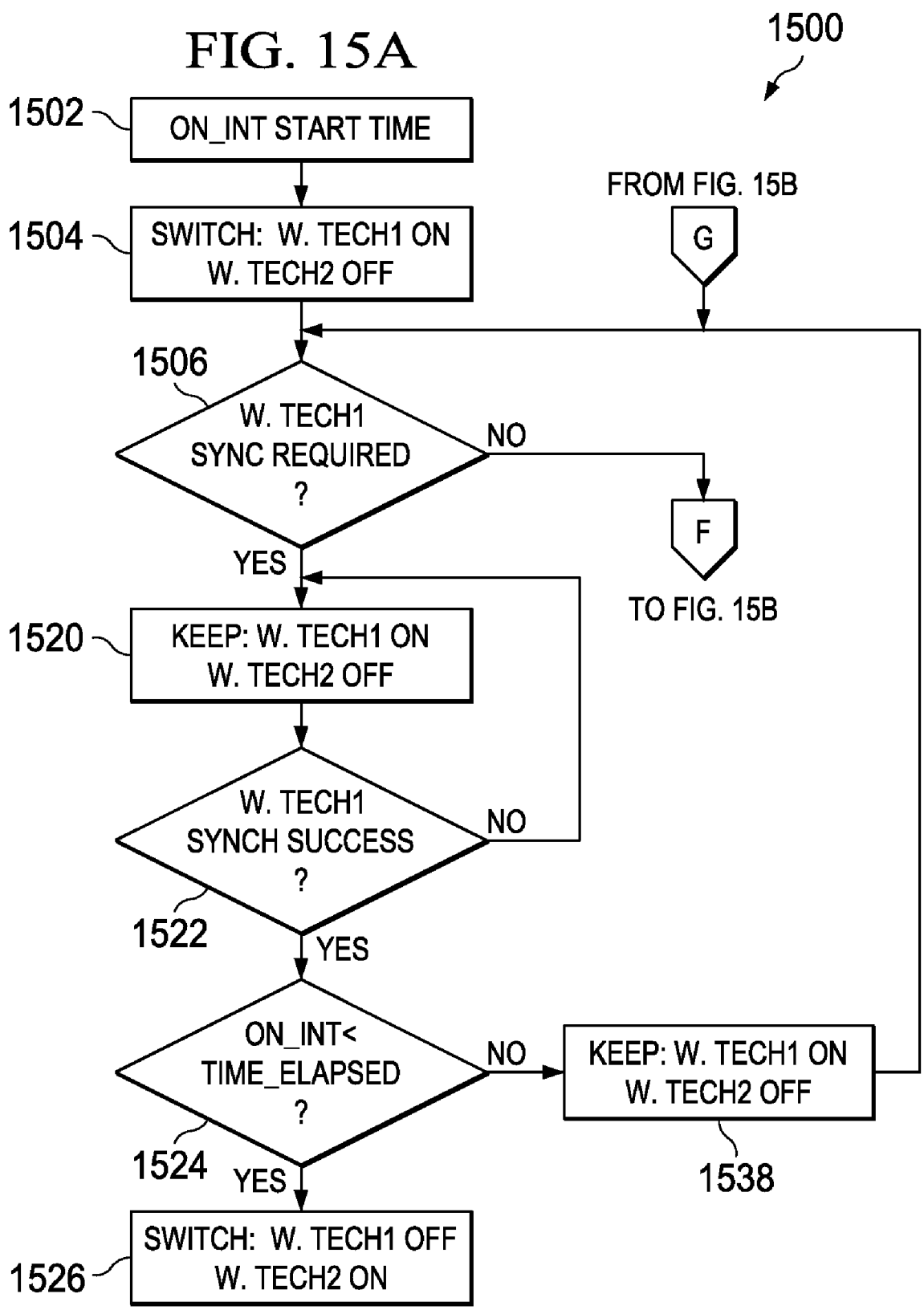

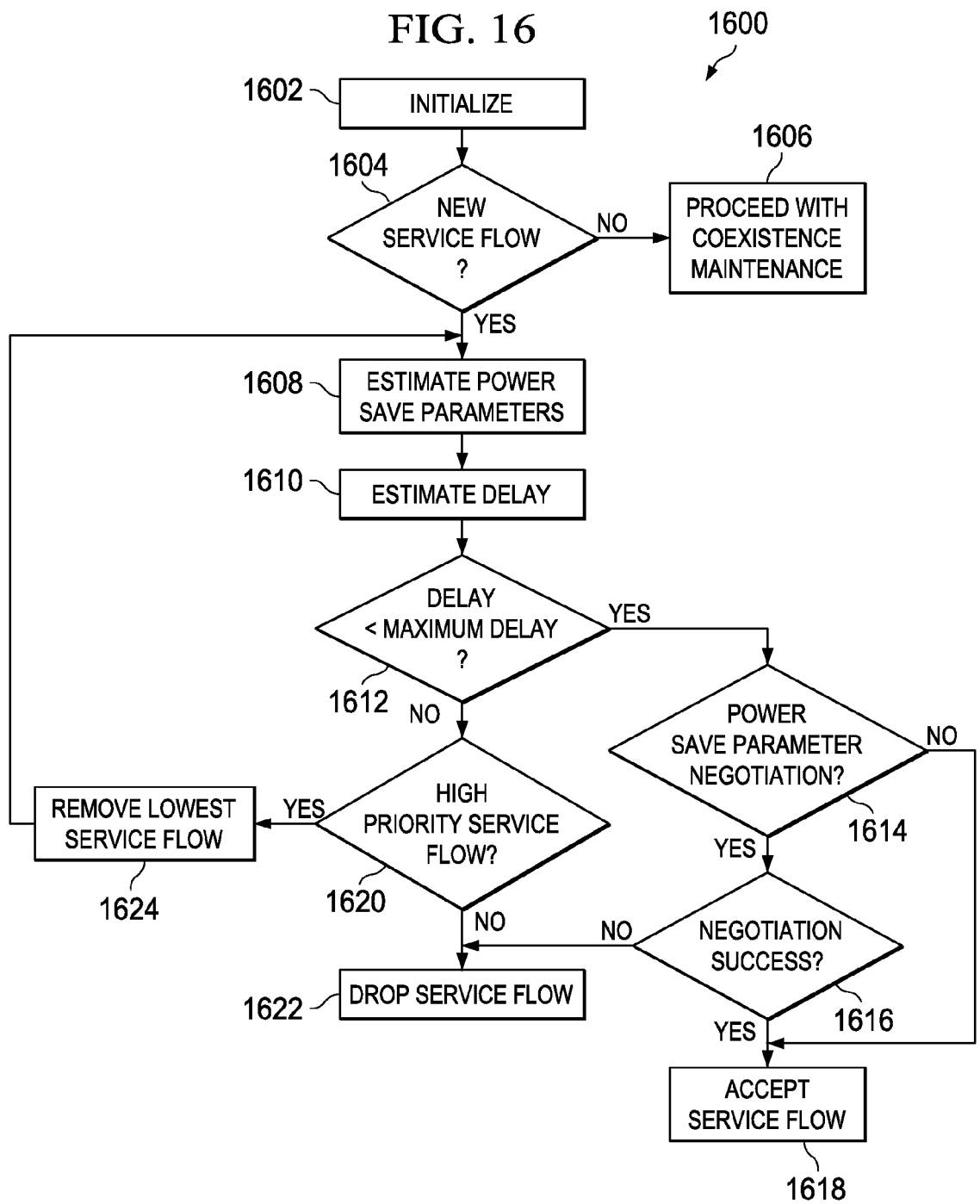

COEXISTENCE OF DIFFERENT NETWORK TECHNOLOGIES

The present application claims priority to U.S. provisional patent application Ser. No. 60/992,400, filed Dec. 5, 2007, entitled "Hybrid Approach to Solving Coexistence Problem in Wireless Networks" and to U.S. provisional patent application Ser. No. 60/955,108, filed Aug. 10, 2007, entitled "Method for Quality of Service Aware Coexistence in Wireless Networks". These provisional applications are hereby incorporated in their entirety herein by reference

BACKGROUND

Next-generation mobile devices will be able to access a variety of network technologies including, for example, worldwide interoperability for microwave access (WiMAX) networks, wireless local area network (WLAN) networks, long term evolution (LTE) mobile telephony networks, personal area networks (PANs), wireless universal serial bus (USB) networks or BLUETOOTH (BT) networks, etc. The various technologies have different transmission timing requirements in order to provide a needed quality of service (QoS). QoS is the ability to provide different priority to different applications, users, or data flows, or to guarantee a certain level of performance to a data flow, e.g., guarantee a required bit rate, delay, jitter, packet dropping probability, bit error rate, etc. QoS guarantees are important, for example, if the network capacity is insufficient or limited. QoS guarantees are also important for real-time streaming multimedia applications such as voice over IP, online games and IP-TV, since these delay sensitive applications often require a fixed bit rate.

The IEEE802.11 specification provides a QoS control protocol that enables a service differentiation to be provided for packets. For example, voice and e-mail traffic require different quality of service levels to provide acceptable service quality. In particular, voice packets need to be delivered within strict delay bounds whereas e-mail packets are more delay tolerant.

While increased access to these technologies will benefit users and operators alike, interference among different technologies, particularly onboard a single device, introduces difficulties during concurrent operation of these technologies. For example, and as illustrated in FIG. 1, WLAN (in 2.4-2.5 GHz) and WiMAX (2.3-2.4 GHz and 2.5-2.7 GHz) technologies operate at relatively close frequency bands with respect to each other—so close, in fact, that the out-of-band emission by either technology may saturate the receiver of the other technology resulting in potential blocking. Therefore, interference between two technologies operating in the same device creates challenges on the coexistence of the corresponding two wireless interfaces of that device.

As a result, various solutions are needed to enable the competition for resources among the technologies onboard a single device to be less apparent and less inconvenient to users.

SUMMARY

In at least some embodiments, a communication device comprises a plurality of network technology subsystems, each subsystem associated with a different network technology. The communication device also comprises a controller coupled to the plurality of network technology subsystems. The controller enables coexistence of the different network technologies in accordance with at least one monitored quality of service (QoS) parameter.

In at least some embodiments, a method for communications comprises monitoring at least one quality of service (QoS) parameter. The method further comprises enabling coexistence of different network technologies in accordance with the at least one monitored QoS parameter.

In at least some embodiments, a communications network comprises at least one technology network. The communications network further comprises a device having at least two network technology subsystems onboard, each subsystem associated with a different network technology. The device further comprising a controller coupled to the subsystems. The controller enables coexistence of the different network technologies in accordance with at least one monitored quality of service (QoS) parameter.

BRIEF DESCRIPTION OF THE DRAWINGS

For a detailed description of various embodiments of the invention, reference will now be made to the accompanying drawings in which:

FIG. 16 illustrates an algorithm for service flow management in accordance with embodiments;

NOTATION AND NOMENCLATURE

Figure 1:
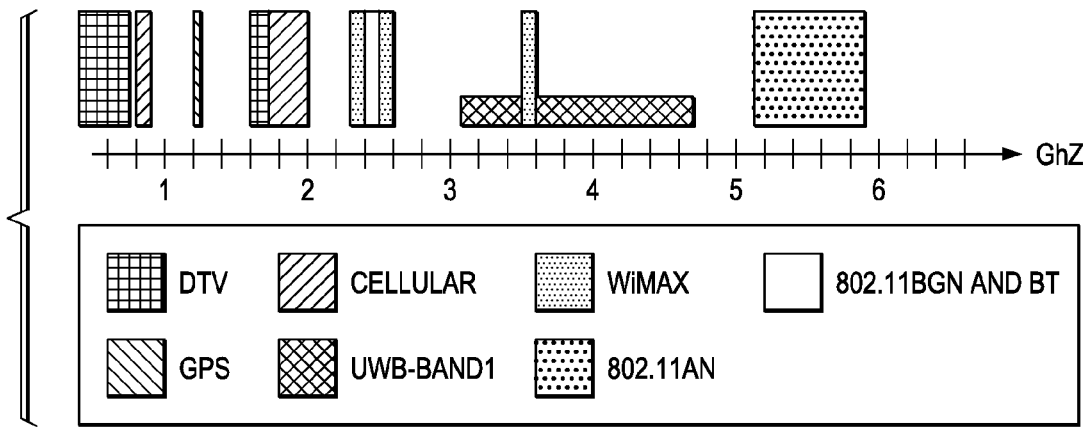
FIG. 1 illustrates different network technologies and their operating bands.

Certain terms are used throughout the following description and claims to refer to particular system components. As one skilled in the art will appreciate, computer companies may refer to a component by different names. This document doe not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In supporting coexistent network technologies onboard the same device, quality of service (QoS) management is a concern. With completely separate traffic flows for each network technology represented on a device, as well as the separate parameters unique to each of those traffic flows, it is necessary for a device controller to store all of the parameters for each of the network traffic flows and keep track how each parameter is to be monitored, reported and acted upon.

Embodiments are directed to communication systems that enable coexistence of different network technologies in accordance with at least one monitored QoS parameter. For example, in at least some embodiments, a monitored QoS parameter (e.g., the packet error rate (PER)) indicates an interference level between different network technologies. Based on the QoS parameter, a communication system may enable coexistence of different network technologies by selectively reducing transmission power of at least one of the different network technologies and/or by utilizing time multiplexing for the different network technologies. To support time multiplexing for the different network technologies, a communication system implements a coexistence algorithm. In at least some embodiments, the coexistence algorithm involves some or all of the steps: monitoring traffic service, ranking traffic flows, maintaining synchronization based on a unified set of synchronization parameters associated with the different network technologies, provisioning traffic and selecting power saving parameters for the different network technologies, and controlling admission of new traffic.

Figure 2:
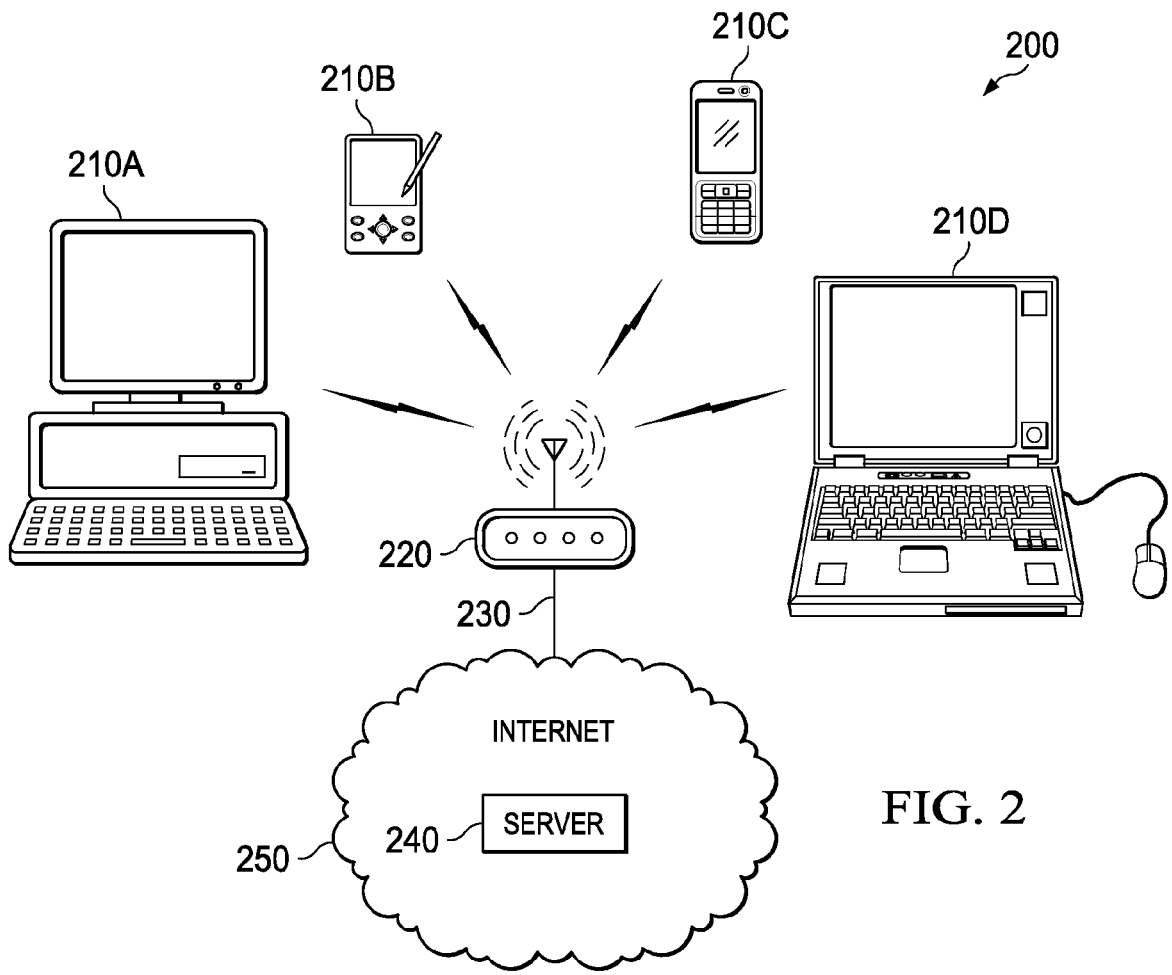
FIG. 2 illustrates an example wireless local area network (WLAN) with an access point and a plurality of wireless devices/stations in accordance with embodiments.

FIG. 2 illustrates a wireless local area network (WLAN) 200 in accordance with embodiments. To provide wireless data and/or communication services (e.g., telephone services, Internet services, data services, messaging services, instant messaging services, electronic mail (email) services, chat services, video services, audio services, gaming services, etc.), the WLAN 200 comprises an access point (AP) 220 and any of a variety of fixed-location and/or mobile wireless devices or stations (STAs) (referred to individually herein as device, station, STA or device/station), four of which are respectively designated in FIG. 2 with reference numerals 210A, 210B, 210C and 210D. It should be appreciated that the network 200 is meant to be illustrative and not exhaustive. For example, it should be appreciated that more, different or fewer communication systems, devices and/or paths may be used to implement embodiments. Exemplary devices 210 include any variety of personal computer (PC) 210A with wireless communication capabilities, a personal digital assistant (PDA) or MP3 player 210B, a wireless telephone 210C (e.g., a cellular phone, a smart phone, etc.), and a laptop computer 210D with wireless communication capabilities. At least one of AP 220 and STAs 210A-210D are preferably implemented in accordance with at least one wired and/or wireless communication standard (e.g., from the IEEE 802.11 family of standards). Further, at least one device 210 comprises a plurality of co-existing wireless network technology subsystems onboard the at least one device 210.

In the example of FIG. 2, to enable the plurality of devices/STAs 210A-210D to communicate with devices and/or servers located outside WLAN 200, AP 220 is communicatively coupled via any of a variety of communication paths 230 to, for example, any of a variety of servers 240 associated with public and/or private network(s) such as the Internet 250. Server 240 may be used to provide, receive and/or deliver services such as data, video, audio, telephone, gaming, Internet, messaging, electronic mail, or other services. Additionally or alternatively, WLAN 200 may be communicatively coupled to any of a variety of public, private and/or enterprise communication network(s), computer(s), workstation(s) and/or server(s) to provide any of a variety of voice service(s), data service(s) and/or communication service(s).

Figure 3:
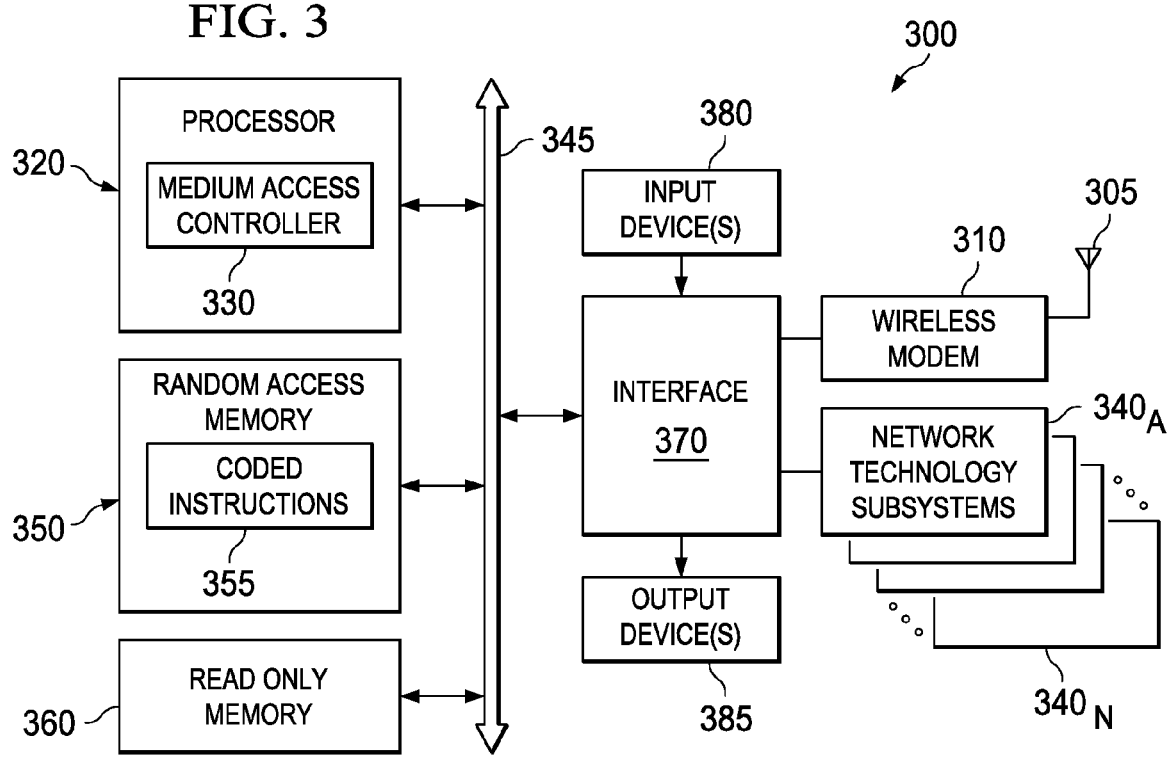
FIG. 3 illustrates an exemplary access point and/or wireless device in accordance with embodiments.

The systems and methods described herein may be implemented on any general-purpose computer with sufficient processing power, memory resources, and network throughput capability to handle the necessary workload placed upon it. FIG. 3 illustrates a device 300 comprising an exemplary general-purpose computer system suitable for implementing at least one embodiment of a system that enables coexistence of different network technologies as disclosed herein. In FIG. 3, the device 300 may be, for example, an access point or other wireless device. It should be expressly understood that any device on, for example, WLAN 200 or other embodiments, may at times be an access point and at other times be a station. It should also be understood that in some embodiments, there may be at least one dedicated access point, with any number of devices acting as stations.

Exemplary device 300 comprises at least one of any of a variety of radio frequency (RF) antennas 305 and any of a variety of wireless modems 310 that support wireless signals, wireless protocols and/or wireless communications (e.g., according to IEEE 802.11n). RF antenna 305 and wireless modem 310 are able to receive, demodulate and decode WLAN signals transmitted in a wireless network. Likewise, wireless modem 310 and RF antenna 305 are able to encode, modulate and transmit wireless signals from device 300 to other devices of a wireless network. Thus, RF antenna 305 and wireless modem 310 collectively implement the "physical layer" (PHY) for device 300. It should be appreciated that device 300 is communicatively coupled to at least one other device and/or network (e.g., a local area network (LAN), the Internet 250, or other devices). It should further be understood that illustrated antenna 305 represents one or more antennas, while the illustrated wireless modem 310 represents one or more wireless modems.

The exemplary device 300 further comprises processor(s) 320. It should be appreciated that processor 320 may be at least one of a variety of processors such as, for example, a microprocessor, a microcontroller, a central processor unit (CPU), a main processing unit (MPU), a digital signal processor (DSP), an advanced reduced instruction set computing (RISC) machine, an (ARM) processor, etc. Processor 320 executes coded instructions 355 which may be present in a main memory of the processor 320 (e.g., within a random-access memory (RAM) 350) and/or within an on-board memory of the processor 320. Processor 320 communicates with memory (including RAM 350 and read-only memory (ROM) 360) via bus 345. RAM 350 may be implemented by dynamic RAM (DRAM), synchronous dynamic RAM (SDRAM), and/or any other type of RAM device. ROM 360 may be implemented by flash memory and/or any other type of memory device.

Processor 320 implements medium access controller (MAC) 330 using one or more of any of a variety of software, firmware, processing thread(s) and/or subroutine(s). MAC 330 provides known MAC functionality and further implements, executes and/or carries out functionality to facilitate, direct and/or cooperate in the coexistence of different network technologies. MAC 330 is implemented by executing one or more of a variety of software, firmware, processing thread(s) and/or subroutine(s) with the example processor 320. In at least some embodiments, MAC 330 may be implemented by hardware, software, firmware or a combination thereof, including using an application specific integrated circuit (ASIC), a programmable logic device (PLD), a field programmable logic device (FPLD), discrete logic, or other components.

Device 300 also preferably comprises at least one input device 380 (e.g., keyboard, touchpad, buttons, keypad, switches, dials, mouse, track-ball, voice recognizer, card reader, paper tape reader, etc.) and at least one output device 385 (e.g., liquid crystal display (LCD), printer, video monitor, touch screen display, a light-emitting diode (LED), etc.)—each of which are communicatively connected to interface 370.

As shown, interface 370 also communicatively couples wireless modem 310 with processor 320 and/or MAC 330. Interface 370 provides an interface to, for example and not by way of limitation, Ethernet cards, universal serial bus (USB), token ring cards, fiber distributed data interface (FDDI) cards, network interface cards, wireless local area network (WLAN) cards, or other devices that enable device 300 to communicate with other devices and/or to communicate via Internet 250 or intranet. With such a network connection, it is contemplated that processor(s) 320 would be able to receive information from at least one type of network technology and/or output information to at least one type of network technology in the course of performing the herein-described processes.

As shown in FIG. 3, the device 300 comprises network technology subsystems $340_A$-$340_N$, where N is the number network technology subsystems in device 300. In accordance with embodiments, device 300 comprises at least two dissimilar network technology subsystems 340. As a result, device 300 is said to have coexisting network technologies. "Dissimilar" is used in this context to mean that at least one of the subsystems 340 is from a different network technology than another one of the subsystems 340. It should be understood that some embodiments of subsystems 340 may have their own dedicated wireless modem and antenna, while other embodiments may share either or both of a wireless modem and antenna. Examples of network technologies that may be represented by such subsystems include, but are not limited to, worldwide interoperability for microwave access (WiMAX) networks, wireless local area network (WLAN) networks, long term evolution (LTE) mobile telephony networks, personal area networks (PANs), wireless universal serial bus (USB) networks, BLUETOOTH (BT) networks, etc. In accordance with embodiments, processor 320 interacts with network technology subsystems 340 via corresponding interfaces $470_A$-$470_N$ (see FIG. 4), which are implemented by interface 370. It should be appreciated that, for the ease of illustration, only two or three such network technologies may be discussed in connection with any particular embodiment. However, the present teachings apply equally to devices having other amounts of technologies onboard a device.

Figure 4:
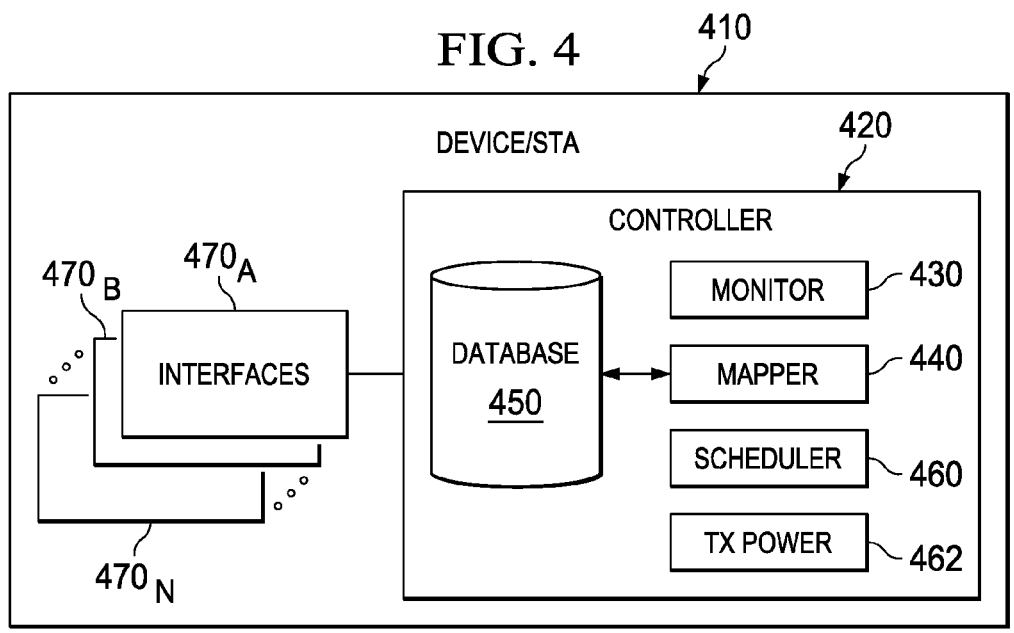
FIG. 4 illustrates an exemplary device in accordance with embodiments.

FIG. 4 illustrates an exemplary device 410 in accordance with embodiments. In at least some embodiments, the device 410 includes some or all of the components described for FIG. 3. As shown in FIG. 4, the device 410 comprises a controller 420 and interfaces $470_A$-$470_N$, where N is the number of onboard network technologies corresponding to each of the respective dedicated interfaces. The interfaces $470_A$-$470_N$, for example, may couple to the network technology subsystems 340A-340N describes previously.

In at least some embodiments, the controller 420 comprises monitor 430, mapper 440, database 450, scheduler 460 and transmission (TX) power unit 462. Mapper 440 performs various mapping functions. Embodiments of device 410 consist of wireless—and, in some cases, wired—links, where each link has a capacity constraint. Because at least some of the links are wireless, some communications may interfere with each other. For example, it may not be possible for two links to be active at the same time because the transmission of one interferes with the transmission of the other. To reduce or eliminate interference, the TX power unit 462 selectively reduces TX power of at least one network technology and in this manner maintains coexistence for different network technologies. As an example, the determination to reduce TX power may be based on at least one monitored QoS parameter such as packet error rate (PER). Additionally, the controller 420 comprises a scheduler 460 that selectively implements time division multiplexing to enable coexistence of different network technologies. In at least some embodiments, the scheduler 460 preferably implements time division multiplexing based on a control algorithm that involves some or all of the steps: monitoring traffic service, ranking and/or prioritizing traffic flows, determining and/or applying a unified set of synchronization parameters, provisioning traffic for different network technologies, selecting power saving parameters, maintaining coexistence of different network technologies, and controlling admission of new traffic.

Controller 420 schedules for how long each active network traffic flow may keep priority for resources of device 410. There are a variety of scheduling options, one of which may be fair allocation. Generally, the device 410 alternates among the various active traffic flows depending upon each service/traffic flow's priority as determined by scheduler 460. Each network preferably takes sequential turns in using resources of device 410 to send packets to—or otherwise communicate with—networks outside of device 410. It should also be appreciated that, in many embodiments, controller 420 also comprises additional functionality such as security inputs (often from a user), managing power saving features for the interfaces, etc.

In at least some embodiments, the controller 420 directs monitor 430 to monitor global traffic flow. In some cases, monitor 430 only monitors the existence of active traffic flows onboard device 410, while in other embodiments, monitor 430 also monitors the type of network technology (e.g., WLAN, BT, WiMAX, etc.) and the type of transmissions (e-mail, streaming video, VoIP, etc.) involved. It should be appreciated that traffic flows can be monitored regardless of type of traffic or whether the traffic is unicast, broadcast, multicast, etc.

Additionally, in at least some embodiments, controller 420 employs monitor 430, to track changes in the active traffic flows. If monitor 430 determines that there has been a change in at least one of the active traffic flows, it also identifies the change. As one example, and not by way of limitation, a WLAN MAC sends a trigger to controller 420 indicating that it wants to add some traffic, i.e., initiate a traffic flow. If, for example, monitor 430 determines that there has been a newly activated traffic flow, then controller 420 calls mapper 440 to map the unique traffic flow parameters of the new network technology traffic flow to a unified set of traffic flow parameters, and outputs the mapped traffic parameters to database 450. The unified set of traffic parameters are provided as input to scheduler 460. If, instead, monitor 430 determines that there has been a decreased number of active traffic flows—in other words, one of the previously active traffic flows is no longer active—controller 420 calls mapper 440 to unmap the traffic flow parameters corresponding to the now inactive traffic flow, and output the unique traffic flow parameters of the corresponding network technology to database 450. Once again, such changes are accepted as input by scheduler 460 to affect scheduling and prioritization of any remaining active traffic flows. If, alternatively, monitor 430 determines that there has been a performance change in at least one of the active traffic flows, controller 420 calls mapper 440 to remap traffic flow parameters corresponding to the specific aspects that have changed. As one example, the packet error rate may have dropped—or increased—meaning that the scheduler 460 will have to work with the appropriate interface 470 to adjust the level of error coding, transmission rate, or other parameters, due to the changed performance of the affected traffic flow.

In at least some embodiments, scheduler 460 prioritizes the service calls (requests) based on the information gathered by monitor 430, which information is mapped to traffic flow parameters by mapper 440. Mapper 440 provides an interface from actual traffic flow parameters specific to each type of network technology to a unified set of traffic flow parameters. Such ability frees scheduler 460 from having to separately and/or duplicatively maintain and understand all unique traffic flow parameter formats for each network technology onboard the device; instead, scheduler 460 can more dynamically focus on scheduling among the requests for service. As a result, by using the unified set of traffic parameters instead of having to look-up and manage separate sets of traffic flows parameters for each network technology onboard a device, the system becomes more scalable and the scheduler is more flexible.

Examples of traffic flows parameters are described in Table 1. Although the parameters listed in Table 1 are described in the context of WiMAX and WLAN subsystems, it should be clearly understood that the approach is the same for other wireless networks (as well as wireline networks). Moreover, it should be readily appreciated that more or fewer traffic flows parameters may be utilized by embodiments.

TABLE 1

Unified set of traffic flow parameters

| Traffic Parameters | Description | Usage |
|---|---|---|
| TF_TYPE | Traffic flow type | UGS, rtVR, ertVR, nrtVR, BE |
| TF_DIRECTION | Traffic flow UL/DL indicator | DL = 0, UL = 1, Peer-2-Peer = 3 |
| MEAN_SDU_SIZE | Traffic flow average SDU_SIZE? | Can be used to calculate average periodicity of the traffic flow. |
| MAX_SDU_SIZE | Traffic flow maximum MSDU size | This can be used to estimate minimum periodicity value to be sustained. |
| MIN_RSV_RATE | Minimum reserved rate for service flow for QoS requirements | Bits per second when averaged over time |

TABLE 1-continued

Unified set of traffic flow parameters

| Traffic Parameters | Description | Usage |
| --- | --- | --- |
| MAX_SUSTAIN_RATE | Maximum sustained peak data rate for traffic flow | Guide actual service flow allocation |
| MEAN_RATE | Average data rate (bps?) | Estimate average period interval for service flow |
| MAX_LATENCY | Maximum latency between MSDU transmit to receive | Can be used to estimate the time "off" for a particular flow |
| MAX_PER | Maximum PER for the traffic flow to maintain its QoS | Can be used to estimate the number of times that transmission may be deferred due to higher priority tasks |
| INTER_ARRIVAL_TIME | Maximum time period within which the data belongs to the TF will not be transmitted | Used to estimate maximum "off" time for the corresponding TF |
| PERIODICITY | Period time interval for the flow | Can be used to estimate the ON-OFF time for the traffic flows. It can be calculated from the data rate and the SDU size |
| START_TIME | Start time for the traffic flow | Can be used to estimate when the scheduler should start considering the traffic flow |

Some of the listed traffic parameters, such as PERIODICITY, can be derived from other traffic parameters. For example, based on the MEAN_RATE and MEAN_SDU_SIZE, periodicity of the service flows can be estimated as:

PERIODICITY=Interval(MEAN_*SDU*_SIZE/ MEAN_RATE)

Once the traffic flow parameters have been collected and mapped, scheduler 460 of controller 420 ranks the active traffic flows based on the traffic type, TF_TYPE. For example, VoIP in WLAN and VoIP in WiMAX are preferably both ranked the highest—the controller preferably takes care of these flows before it accommodates/supports other traffic flows. The services are preferably arranged in a set of Quality of Service (QoS) classes to which priorities are assigned: unsolicited grant service (UGS), extended real-time variable rate (ERT-VR) real-time variable rate (rtVR), non-real time variable rate (NRT-VR), best efforts (BE), etc. Resource scheduling is performed by sharing the radio resources available among the QoS classes as a function of the priorities, whereby the QoS classes having a lower priority (RT-VR) may utilize the amount of resources left unused by the classes having a higher priority (UGS, ERT-VR).

Figure 5:
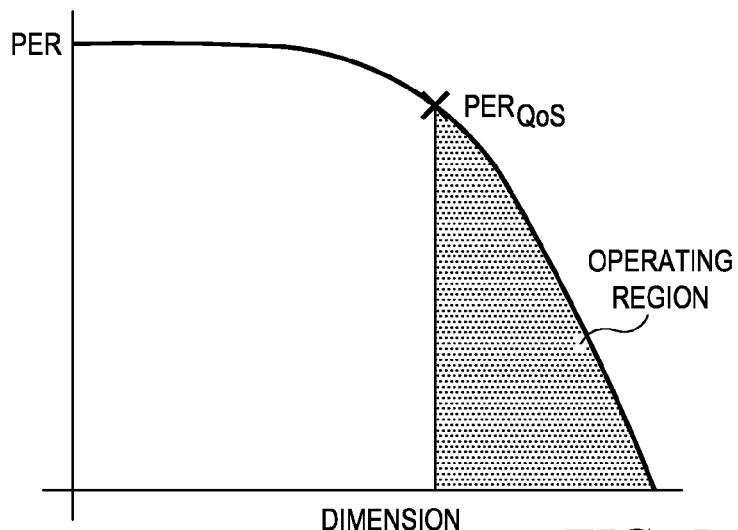
FIG. 5 illustrates an operating region for communications in accordance with embodiments.

FIG. 5 shows an operating region for communications in accordance with embodiments. In FIG. 5, the operating range is defined by a QoS packet error rate threshold ($PER_{QoS}$) along a dimension which represents, for example, a signal-to-noise ratio (SNR), distance between communicating devices, received signal strength (RSS), carrier to interference and noise ratio (CINR), or any other value related to the PER. In general, FIG. 5 shows that the embodiments operate by maintaining a PER for communications that is less than a predetermined threshold for a given dimension.

In accordance with embodiments, various transmit and receive options for different network technologies are possible. Table 2 shows various options, where PER is given as the PHY parameter that maps to the protocol solution.

TABLE 2

TX/RX pair combinations for WiMAX and WLAN.

| | WiMAX | | WLAN |
| --- | --- | --- | --- |
| TX | PER w/o WLAN Tx PER w/ WLAN Tx | TX | PER w/o WiMAX Tx PER w/ WiMAX Tx |
| TX | PER w/o WLAN Rx PER w/ WLAN Rx | RX | PER w/o WiMAX Tx PER w/o WiMAX Tx |
| RX | PER w/o WLAN Tx PER w/ WLAN Tx | TX | PER w/o WiMAX Rx PER w/ WiMAX Rx |
| RX | PER w/o WLAN Rx PER w/ WLAN Rx | RX | PER w/o WiMAX Rx PER w/ WiMAX Rx |

For every TX/RX pair combination, PER values should be available before a decision is made whether this TX/RX pair would impact the coexistence. Based on the PER values, a decision can be made on the power levels that WiMAX and/or WLAN subsystems are allowed to transmit. If the transmitted power level can still not satisfy the requirements (for example, for QoS support), then the transmission from one of the subsystems (for example, the one supporting lower priority traffic) is not allowed at this time.

In accordance with some embodiments, TX/RX combinations are not acceptable because transmission of one technology can de-sense the receiver of the other technology due to the proximity of the operating bands. TX/TX combinations are acceptable assuming the impact of the transmission will be measured at a receiver far away from the device. RX/RX combinations are acceptable assuming the receivers are designed such that they can handle the interference from the other transmitters. In such embodiments, it would be helpful for WLAN receivers to avoid hidden node issues.

Figure 6:
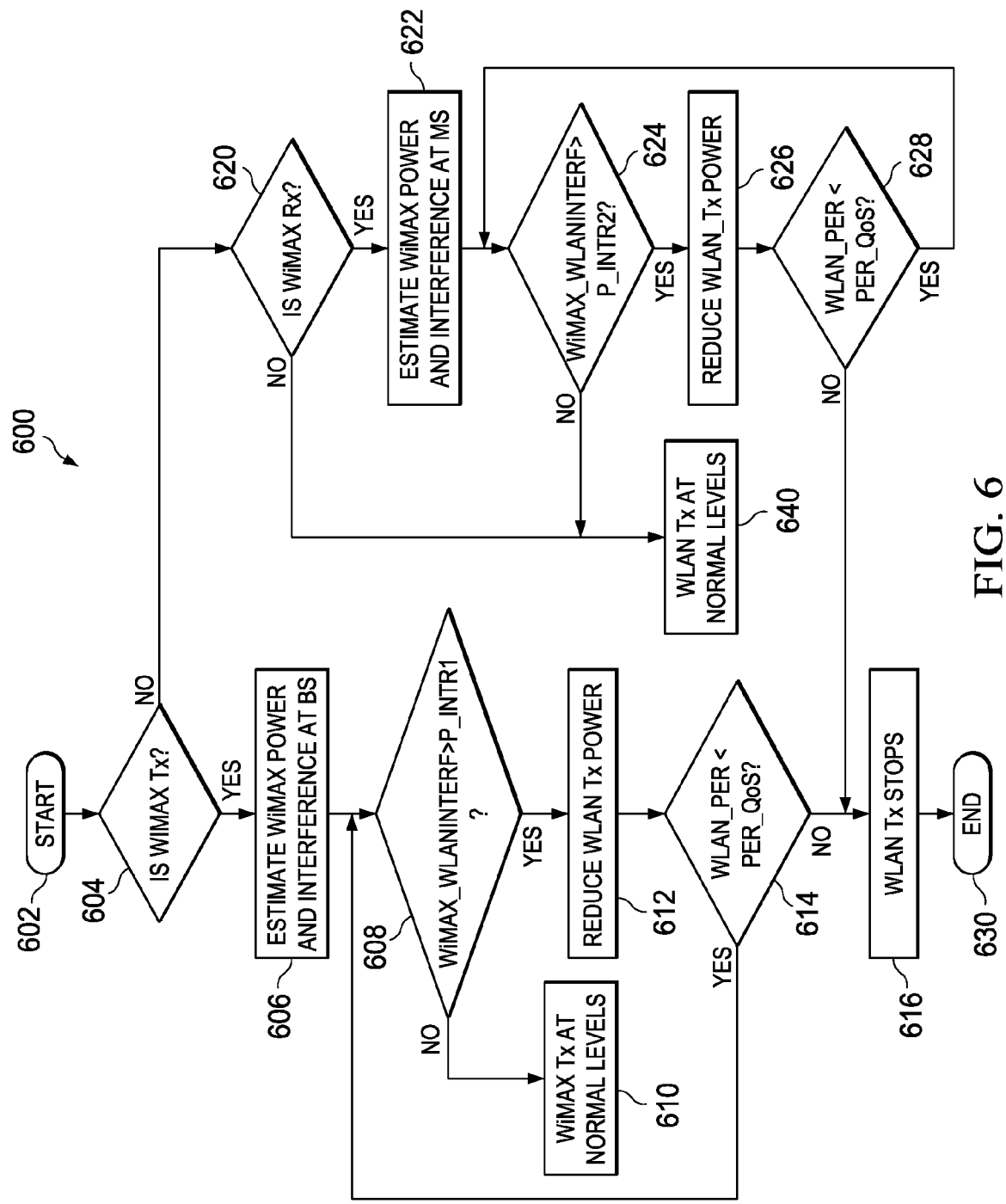
FIG. 6 illustrates a WLAN power adjustment algorithm in accordance with embodiments.

FIG. 6 is illustrative of a WLAN power adjustment algorithm 600 in accordance with embodiments. In FIG. 6, the algorithm 600 begins at block 602 and then determines if WiMAX transmissions are occurring (decision block 604). If WiMAX transmissions are occurring (decision block 604), the WIMAX power and interference at a corresponding base station are estimated (block 606). If WiMAX and WLAN interference (WiMAX_WLANInterf) are less than a predetermined threshold (P_intr1) (decision block 608), WMAN transmissions occur at normal (default) power levels (block 610). Otherwise, the power level of WLAN transmissions is reduced (block 612). If the PER level of WLAN communications (WLAN_PER) is less than a QoS threshold (PER_QoS) (decision block 614), the algorithm returns to decision block 608. If WLAN_PER is greater than PER_QoS (decision block 614), WLAN transmissions are stopped (block 616).

Returning to decision block 604, if WiMAX transmissions are not occurring, the algorithm 600 determines is WiMAX receptions are occurring (decision block 620). If not, WLAN transmissions occur at normal (default) power levels (block 640). If WiMAX receptions are occurring (decision block 620), WiMAX power and interference at a corresponding mobile station are estimated (block 622). If WiMAX and WLAN interference (WiMAX_WLANInterf) are less than a predetermined threshold (P_intr2) (decision block 624), WLAN transmissions occur at normal (default) power levels (block 640). Otherwise, the power level of WLAN transmissions is reduced (block 626). If WLAN_PER is less than PER_QoS (decision block 628), the algorithm 600 returns to decision block 624. If WLAN_PER is greater than PER_QoS (decision block 628), WLAN transmissions are stopped (block 616). The algorithm 600 ends at block 630.

Figure 7:
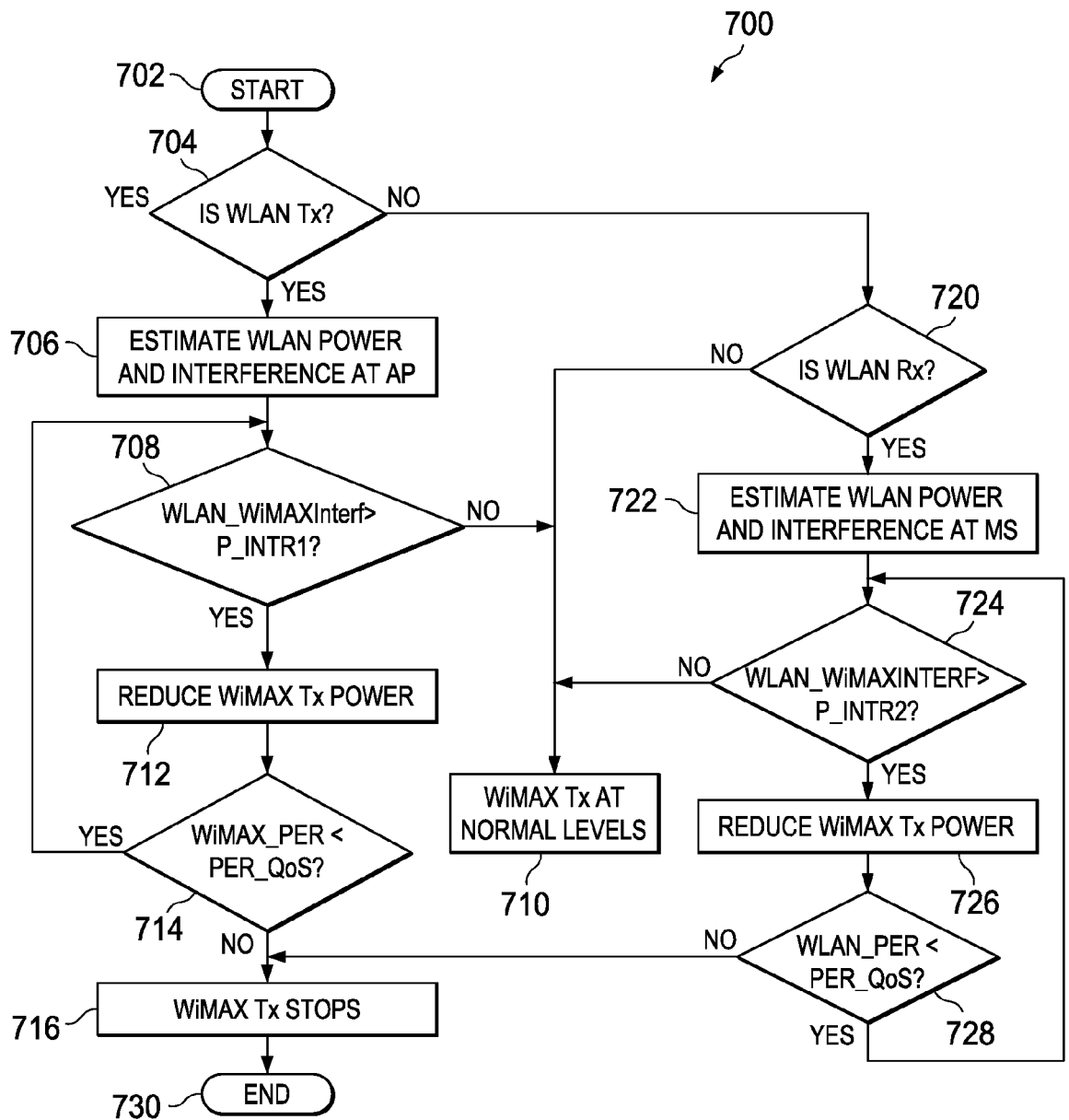
FIG. 7 illustrative a WiMAX power adjustment algorithm in accordance with embodiments.

FIG. 7 is illustrative of a WiMAX power adjustment algorithm 700 in accordance with embodiments. In FIG. 7, the algorithm 700 begins at block 702 and involves determining if WLAN transmissions are occurring (decision block 704). If WLAN transmissions are occurring (decision block 704), the WLAN power and interference at a corresponding access point are estimated (block 706). If WiMAX and WLAN interference (WiMAX_WLANInterf) are less than a predetermined threshold (P_intr1) (decision block 708), WiMAX transmissions occur at normal (default) power levels (block 710). Otherwise, the power level of WiMAX transmissions is reduced (block 712). If the PER level of WiMAX communications (WiMAX_PER) is less than a QoS threshold (PER_QoS) (decision block 714), the algorithm returns to decision block 708. If WiMAX_PER is greater than PER_QoS (decision block 714), WiMAX transmissions are stopped (block 716).

Returning to decision block 704, if WLAN transmissions are not occurring, the algorithm 700 determines is WLAN receptions are occurring (decision block 720). If not, WiMAX transmissions occur at normal (default) power levels (block 710). If WLAN receptions are occurring (decision block 720), WLAN power and interference at a corresponding mobile station are estimated (block 722). If WiMAX and WLAN interference (WiMAX_WLANInterf) are less than a predetermined threshold (P_intr2) (decision block 724), WiMAX transmissions occur at normal (default) power levels (block 710). Otherwise, the power level of WiMAX transmissions is reduced (block 726). If WiMAX_PER is less than PER_QoS (decision block 728), the algorithm 700 returns to decision block 724. If WiMAX_PER is greater than PER_QoS (decision block 728), WiMAX transmissions are stopped (block 716). The algorithm 700 ends at block 730.

Figure 8:
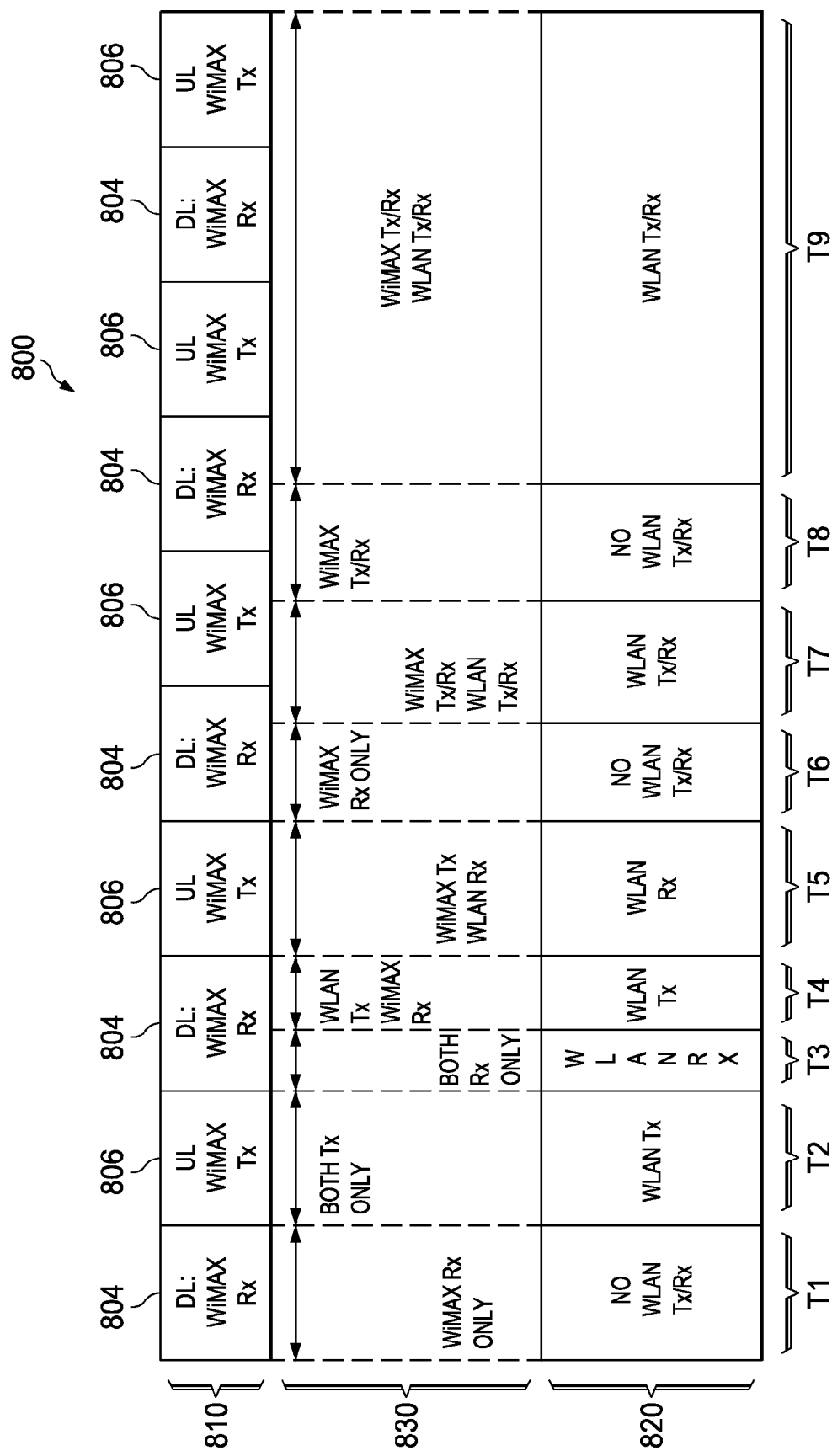
FIG. 8 illustrates a timing diagram for WiMAX/WLAN coexistence in accordance with embodiments.

FIG. 8 is a timing diagram 800 for WiMAX/WLAN coexistence in accordance with embodiments. In the timing diagram 800, WiMAX frames 810 comprise alternating downlink frames 804 and uplink frames 806. Meanwhile, WLAN operations 820 involve periods in which WLAN is "off" or "on" (transmission, reception, or both). Also, the combined WiMAX/WLAN operations 830 are shown for different time periods T1-T9. In T1 and T6, WiMAX receptions occur with no WLAN operations. In T2, WLAN and WiMAX transmissions occur. In T3, WLAN and WiMAX receptions occur. In T4, WLAN transmissions and WiMAX receptions occur. In T5, WiMAX transmissions and WLAN receptions occur. In T7 and T9, transmissions and receptions occur for both WiMAX and WLAN. In T8, WiMAX transmissions and receptions occur with no WLAN operations. The timing diagram 800 is not intended to limit WiMAX/WLAN coexistence operations and simply illustrates that various WiMAX/WLAN coexistence options are possible.

Figure 9:
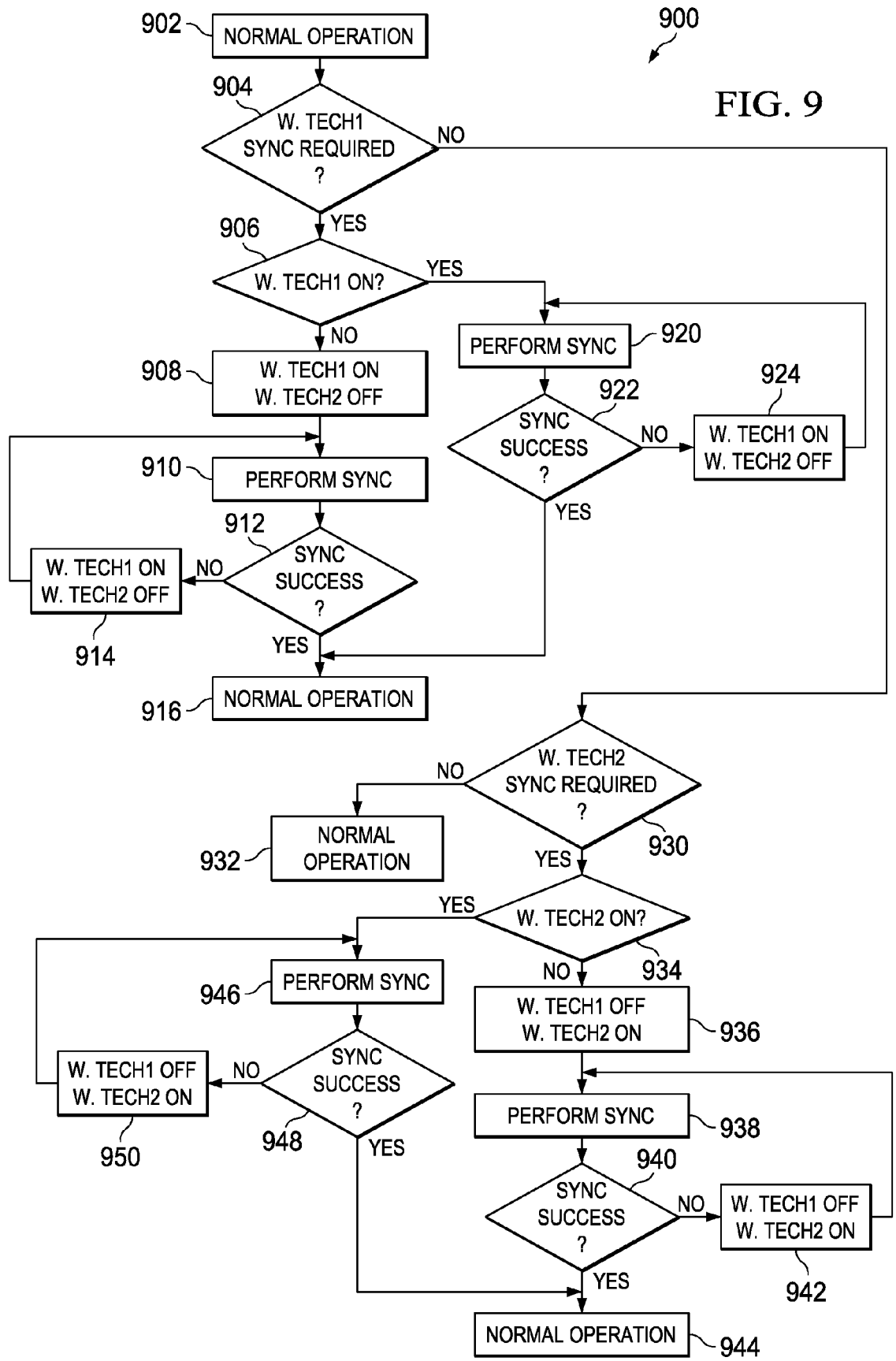
FIG. 9 illustrates a synchronization maintenance algorithm in accordance with embodiments.

FIG. 9 shows a synchronization maintenance algorithm 900 in accordance with embodiments. The synchronization maintenance algorithm 900 involves a first network technology and a second network technology (e.g., WiMAX and WLAN). The algorithm 900 begins with normal operation at block 902. As used herein, "normal" operation refers to a coexistence state (e.g., WiMAX/WLAN) where the first and second network technologies take turns communicating based on time division multiplexing.

If synchronization is required for a first wireless technology (decision block 904), the algorithm 900 determines if the first wireless technology is "on" (decision block 906). If the first wireless technology is "on" (decision block 906), synchronization is performed at block 920. If synchronization is successful (decision block 922), normal operation continues at block 916. Otherwise, the algorithm 900 ensures the first wireless technology is "on" and a second wireless technology is "off" (block 924) before returning to block 920 to perform synchronization.

Returning to decision block 906, if the first wireless technology is not "on", the algorithm 900 turns the first wireless technology "on" and the second wireless technology "off" (block 908) and proceeds with synchronization at block 910. If the synchronization is successful (decision block 912), normal operation continues at block 916. Otherwise, the algorithm 900 ensures the first wireless technology is "on" and the second wireless technology is "off" (block 914) before returning to block 910 to perform synchronization.

Returning to decision block 904, if synchronization is not required for the first wireless technology, the algorithm 900 determines if synchronization is required for the second wireless technology (decision block 930). If not, normal operation continues at block 932. If synchronization is required for the second wireless technology (decision block 930), the algorithm 900 determines if the second wireless technology is "on" (decision block 934). If so, synchronization is performed at block 946. If synchronization is successful (decision block 948), normal operation continues at block 944. Otherwise, the algorithm 900 ensures the first wireless technology is "off" and the second wireless technology is "on" (block 950) before returning to block 946 to perform synchronization.

Returning to decision block 934, if the second wireless technology is not "on", the algorithm 900 turns the first wireless technology "off" and the second wireless technology "on" (block 936) and proceeds with synchronization at block 938. If the synchronization is successful (decision block 940), normal operation continues at block 944. Otherwise, the algorithm 900 ensures the first wireless technology is "off" and the second wireless technology is "on" (block 942) before returning to block 938 to perform synchronization.

In accordance with at least some embodiments, a discussion of WiMAX and WLAN synchronization parameters will now be given. Assuming that the corresponding MS/STA is already connected to one of the networks and that the power save parameters for WiMAX are selected such that the MS/STA maintains DL/UL synchronization, then the remaining task is reception of DCD/UCD messages in WiMAX and Beacons in WLAN network. The time to receive DCD/UCD messages is based on DCD_Interval and UCD_Interval, which are in the order of seconds. Further, listening to Beacons in WLAN is based on a Listening_Interval, which could be in the order of hundreds of milliseconds. Accordingly, the timeout intervals for the DCD/UCD messages, as well as DL/UL-MAPs and the Listening_Interval in WLAN are maintained by the controller 420. In other words, the controller 420 should make sure that there is sufficient time to transition between network technologies. If synchronization is lost with a first and/or second network technology, the controller 420 attempts to recover synchronization.

In addition to the above coexistence options, knowledge regarding when there are slots allocated for the WiMAX device to receive/transmit packets can be helpful in scheduling a WLAN device/chip to transmit/receive. For example, during an available interval, if there are no packets/frames allocated for the MS/STA in the DL and there are no UL allocations for the MS/STA, the controller 420 can turn WLAN "on" for transmit/receive or to simply receive. Making use of such enhancements would require scheduling and collaboration at the AP and BS.

In accordance with at least some embodiments, the controller 420 creates fixed intervals of sleep and awake time windows. In some embodiments, sleepWin and listeningWin are made constant and follow the periodicity of UGS traffic as will later be described. In some embodiments, UGS and rtVR traffic flows are present. Under this scenario, differences in the periodicity of the traffic flows and the time at which the MS/STA operates in WLAN mode is variable. Thus, modification to listenWin and sleepWin for UGS and rtVR can be done such that delay introduced for WLAN traffic flows is kept constant and satisfies latency requirements. In at least some embodiments, the proposed coexistence algorithm results in fixed listenWin and sleepWin time intervals. In such embodiments, restrictions for UL transmission are taken into consideration (e.g., there is only one data allocation Information Element (IE) per MS/STA). If hybrid automatic repeat request (HARQ) is used to transmit data in the UL sub-frame, then the above restriction can be removed and the base station (BS) is notified that data can be transmitted in all frames in the listeningWin provided by that HARQ.

In accordance with embodiments, a total delay time is determined. If the inter-arrival times for traffic flows in WLAN have an average arrival rate of $\lambda$ and a standard deviation of $\sigma_a$ and if the variance of the service time for the flow of interest have a mean TWLAN and a standard deviation of $\sigma_b$, then the service time for any flow will depend on the AI interval (time in WiMAX mode) as well as the time taken in WLAN. By neglecting collisions in WLAN, delay analysis can be done using G/G/1 queuing. Therefore, $T_S=T_{AI}+T_{WLAN}$, where $T_S$ denotes the service time, $T_{AI}$ denotes the available interval, and $T_{WLAN}$ denotes the service time in WLAN if WiMAX is not present. Using the G/G/1 formula results in:

$$E[T] \leq \frac{\lambda(\sigma_a + \sigma_b)}{2(1-\rho)} - \frac{\lambda(1-\rho)\sigma_a^2}{2},$$

where E( ) denotes the expected value and T is the total time for this traffic flow. Therefore, in at least some embodiments, $T_{AI}$ and $T_{UI}$ intervals are selected such that:

$E[T] < \text{Max} \cdot QoS \; Delay_{WLAN}$ $T_{UI} = \bigcup_i T_{UI}^i - \bigcap_{i,j,i \neq j} T_{AI}^j T_{UI}^i$ such that $\begin{cases} T_{UI} < \text{Max} \cdot QoS \; Delay_{WiMAX} \\ T_{UI} < TXOP_{WLAN} \end{cases}$ $T_{AI} = \bigcup_i T_{AI}^i$ such that $T_{AI}$ satisfies MIN_RESERVE_RATE To ensure proper network technology synchronization, two scenarios are considered. In the first scenario, an MS/STA is associated with a WLAN network and starts services/synchronization with a WiMAX network. In the second scenario, the MS/STA is associated with WiMAX network and starts association with WLAN network. Synchronization also involves gathering synchronization parameters from WiMAX and WLAN MACs as well as synchronization maintenance. In accordance with some embodiments, synchronization with a WiMAX network starts with preamble detection and BSS acquisition, continues with DL and UL synchronization, and follows with initial ranging, SBC, and DSA. The figures provided herein describe many of these features in greater detail.

Figure 10:
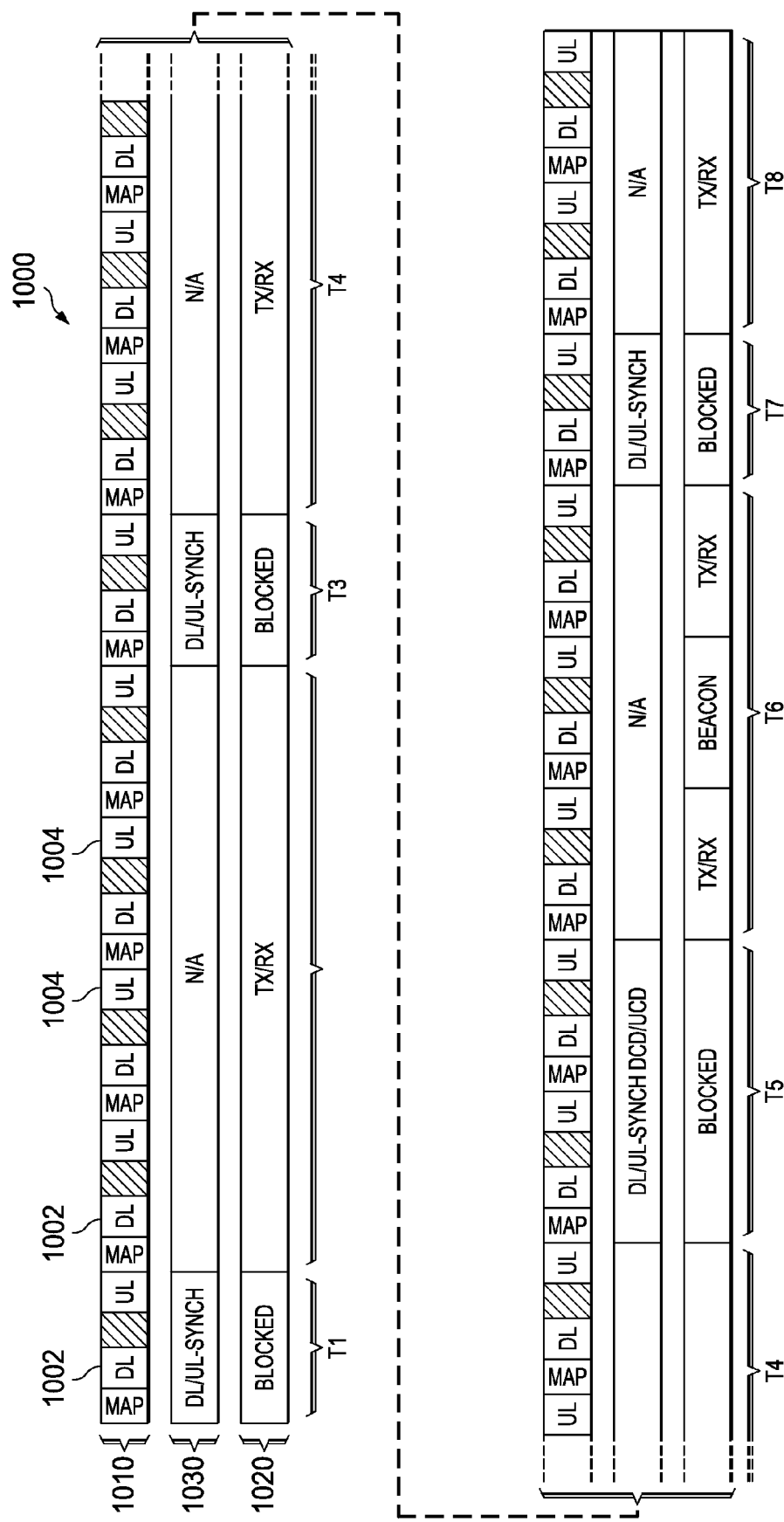
FIG. 10 illustrates a timing diagram showing synchronization without traffic flows in accordance with embodiments.

FIG. 10 is a timing diagram 1000 showing synchronization without traffic flows in accordance with embodiments. In the timing diagram 1000, WiMAX frames 1010 comprise alternating downlink frames 1002 and uplink frames 1004. Meanwhile, WLAN synchronization operations 1020 and WiMAX synchronization operations 1030 occur during different time periods T1-T8. In T1, T3 and T7, WiMAX synchronization occurs while WLAN operations are blocked. In T2, T4, and T8, WLAN operations occurs without regard to WiMAX operations. In T6, a WLAN Beacon is received during WLAN operations without regard to WiMAX operations. The timing diagram 1000 is not intended to limit WiMAX/WLAN synchronization operations and simply illustrates that various WiMAX/WLAN synchronization operations are possible. In FIG. 10, the time for DL/UL synchronization can be defined as min(DL-MAP_Timeout, UL-MAP_Timeout). Since these values can be selected by the SS/STA, then it is preferable to select the values such that DCD_UCD_Interval=k*min(DL-MAP_Timeout, UL-MAP_Timeout), where k is an integer. In addition min(DL_MAP_Timeout, UL-MAP_Timeout)≠TBTT (target beacon transmission time) and DCD_UCD_Interval≠TBTT.

In at least some embodiments, on/"off" intervals in WiMAX (otherwise known as available and unavailable time intervals) satisfy the following requirements:

OFF_WiMAX_Interval<min(DL_MAP_Timeout, UL-MAP_Timeout, MAX_LATENCY_WiMAX)

ON_WiMAX_Interval<min(TBTT, Listen_Interval, MAX_LATENCY_WLAN)

The timing diagram 1000 could be representative, for example, of a scenario when VoIP flow is active in WiMAX and other periodic traffic flow in WLAN (e.g., streaming). Assuming 64 Kbps VoIP traffic and a packet size of 60 bytes, packets arrive at a rate of 1 packet every 7.5 msec. Therefore, an unavailable time of 2 WiMAX frames, each 5 msec long, will introduce a delay of up to 27 msec for the packets. This value is still within the bounds of MAX_LATENCY; hence satisfying QoS latency requirements. Since the VoIP can handle higher latency requirements (up to 50 msec in WiMAX), the unavailable time could be increased from 2 WiMAX frames to, for example, 4 WiMAX frames. The traffic flow in WLAN in this scenario should be able to handle delays of at least 3 WiMAX frames in addition to access delays in a WLAN network.

In the case of a periodic traffic flow and a non-periodic traffic flow, the non-periodic flow is forced to have on/"off" intervals opposite to the on/"off" intervals for the periodic flow. The same constraints apply to the on/off time intervals:

OFF_WiMAX_Interval<min(DL_MAP_Timeout, UL-MAP_Timeout, MAX_LATENCY_WiMAX)
ON_WiMAX_Interval<min(TBTT, Listen_Interval, MAX_LATENCY_WLAN)

For example, assuming that VoIP is active in WiMAX and BE is active in WLAN, the unavailable and available time intervals in WiMAX should be 2 WiMAX frames and 3 WiMAX frames, respectively. Under these conditions, MAX_LATENCY is satisfied, while the throughput for BE flow may suffer in WLAN.

If both traffic flows are non-periodic, the on/"off" intervals can be set such that they are proportional to the data rate requirements for both flows:

ON_WiMAX_Interval/OFF_WiMAX_Interval=Traffic_Rate_WiMAX/Traffic_Rate_WLAN

In at least some embodiments, the on/"off" intervals also satisfy the following constraints:

OFF_WiMAX_Interval<min(DL_MAP_Timeout, UL-MAP_Timeout, MAX_LATENCY_WiMAX)
ON_WiMAX_Interval<min(TBTT, Listen_Interval, MAX_LATENCY_WLAN)

If the power save parameters negotiated initially for WLAN/WiMAX are not adequate to satisfy QoS requirements, then the controller 420 requests re-negotiations of these parameters. For WLAN, these parameters are controlled by the AP. For WiMAX, the new parameters are requested via the RNG-REQ. Once traffic provisioning and the power save class parameters have been chosen, the controller 420 controls when to turn on/off WiMAX and WLAN MAC modules.

Figure 11:
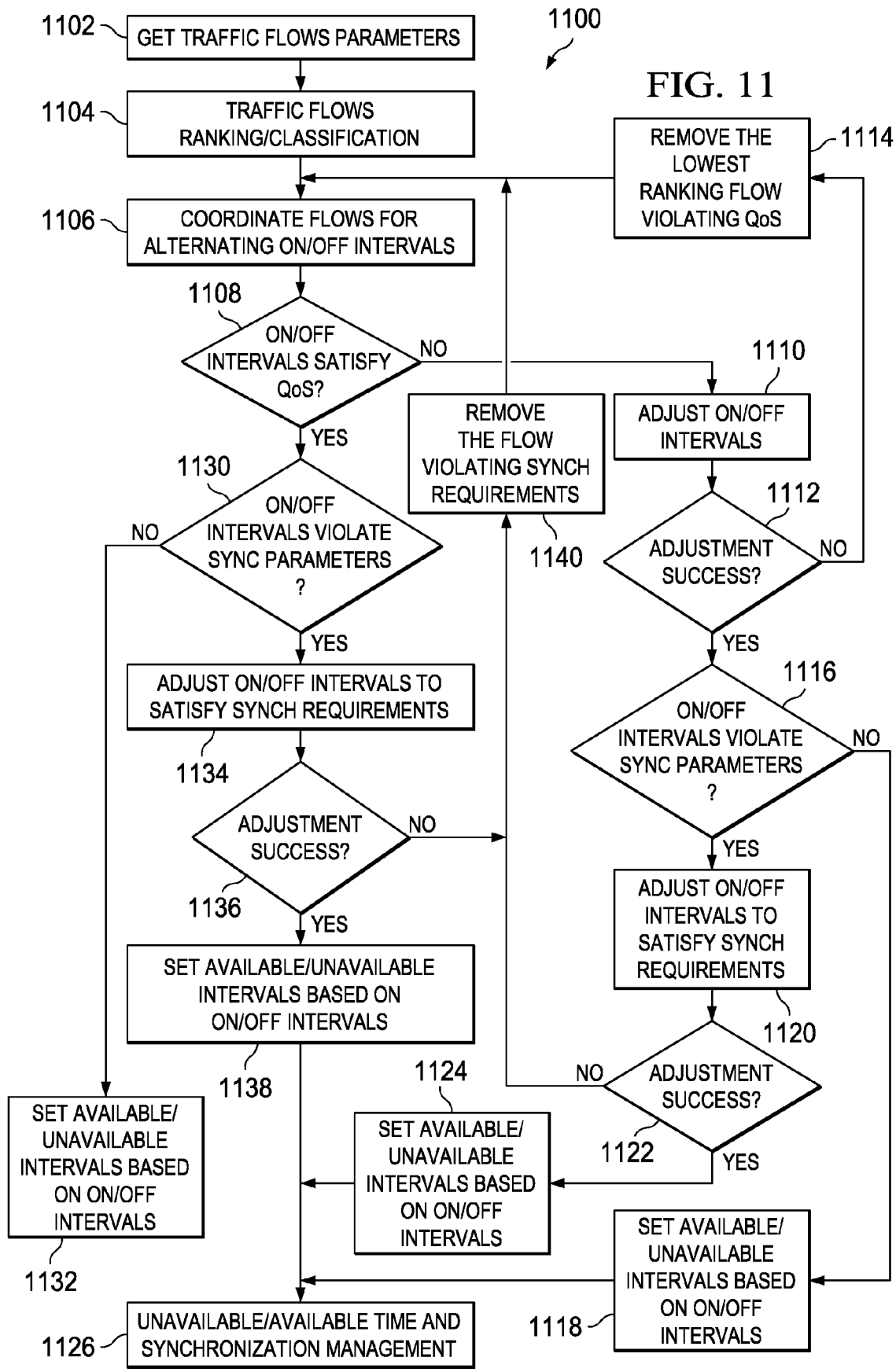
FIG. 11 illustrates a traffic provisioning algorithm in accordance with embodiments.

FIG. 11 is a traffic provisioning algorithm 1100 in accordance with embodiments. The algorithm 1100 begins by getting traffic flow(s) parameters (block 1102) and ranking/classifying traffic flows (block 1104). The traffic flows are then coordinated for alternating on/"off" intervals (block 1106). If the on/"off" intervals satisfy a QoS threshold (decision block 1108), the algorithm 1100 determines whether the on/"off" intervals violate synchronization parameters (decision block 1130). If not, the algorithm 1100 sets available/unavailable intervals based on the on/"off" intervals (block 1132). If the on/"off" intervals violate synchronization parameters (decision block 1130), the on/"off" intervals are adjusted to satisfy the synchronization requirements (block 1134). If the adjustments are successful (decision block 1136), the available/unavailable intervals are set based on the adjusted on/"off" intervals (block 1138). Otherwise, traffic flows violating the synchronization requirements are removed (block 1140).

Returning to decision block 1108, if the on/"off" intervals do not satisfy the QoS threshold, the on/"off" intervals are adjusted (block 1110). If the adjustments are not successful (decision block 1112), the lowing ranking traffic flow violating QoS is removed (block 1114) and the algorithm returns to block 1106. If the adjustments are successful (decision block 1112), the algorithm 1100 determines if the on/"off" intervals violate synchronization parameters (decision block 1116). If not, the available/unavailable intervals are set based on the on/"off" intervals (block 1118). If the on/"off" intervals violate synchronization parameters (decision block 1116), the on/"off" intervals are adjusted to satisfy synchronization requirements (block 1120). If the adjustments are successful (decision block 1122), the available/unavailable intervals are set based on the adjusted on/"off" intervals (block 1124). Otherwise, the traffic flows that violate synchronization requirements are removed (block 1140) and the algorithm 1100 returns to block 1106. After the available/unavailable intervals have been set (either of blocks 1118, 1124 or 1138), the available/unavailable times and synchronization for traffic flows are managed at block 1126. It should that noted that available/unavailable intervals can be adjusted based on other control parameters (e.g., power save parameters) besides synchronization parameters.

In accordance with at least some embodiments, a discussion of a generalized traffic provisioning algorithm for WiMAX and WLAN will now be given with the following steps:

1. Get active traffic flows parameters for WiMAX and WLAN.
2. Map active traffic flows to user priority classes.
3. Get highest ranked traffic class.
4. If highest ranked traffic class is WLAN flow, then do the following.
   a. Estimate λ (the arrival rate for the traffic flow), $\sigma_a$ (the standard deviation of the interarrival times), and $\sigma_b$ (the standard deviation of the service times of the traffic flow). The arrival rate statistics can be derived from the flow statistics, while the service time is the time that it takes a packet of this flow from the arrival till the successful delivery to the recipient.
   b. Calculate $T_{AI}$ (available time interval) in WiMAX such that MAX_LATENCY>E[T] calculated as:

$$E[T] \le \frac{\lambda(\sigma_a + \sigma_b)}{2(1-\rho)} - \frac{\lambda(1-\rho)\sigma_a^2}{2}$$

where ρ is the utilization factor, and E[T] is the total delay for the VoIP in WLAN. Note that the service time in this case includes the service time in the absence of "blackout" intervals due to the WiMAX mode operation of the device plus the $T_{AI}$.
   c. Once the $T_{AI}$ has been estimated, the next step is to calculate $T_{UI}$ (unavailable time interval for WiMAX operation). $T_{UI}$ value should be such that $TXOP_{WLAN} < T_{UI}$.
5. If the highest ranked traffic class is WiMAX flow, then do the following:
   a. Calculate MAX_LATENCY$_{WiMAX}$<$T_{UI}$
   b. Calculate $T_{AI}$ such that MIN_RESERVE_RATE #alloc.*SDU_SIZE/($T_{AI}$+$T_{UI}$)
6. If there are more flows, proceed with the next highest ranked traffic flow.
   a. If WLAN flow
      Estimate λ (the arrival rate for the traffic flow), $\sigma_a$ (the standard deviation of the interarrival times), and $\sigma_b$ (the standard deviation of the service times the traffic flow).
      Calculate $T_{UI}$ such that the sum of TXOP for all WLAN traffic flows is less than $T_{UI}$.
      If WiMAX MAC_LATENCY>$T_{UI}$ then, drop this flow.
      Else, if MAX_LATENCY for previous WLAN flows is increased due to the delay added by the TXOP of this flow, drop this flow.
      Else, if MIN_RESERVE_RATE for WiMAX flows is not satisfied with the change on $T_{UI}$, then if the BS can accommodate more resources in the available $T_{AI}$, accept the flow, otherwise, change $T_{AI}$ parameter.

If changing $T_{AI}$ parameters violates MAX_LATENCY for WLAN, drop this flow, otherwise, accept the flow.

If no condition is violated, accept the flow.

b. If WiMAX flow

Calculate if sum of MIN_RESERVE_RATE requirements for all WiMAX traffic flows is greater than the sum of all allocated resources averaged over the interval of $T_{UI}+T_{AI}$ If WIMAX MAX_LATENCY is violated for any previous flow due to the change on the $T_{AI}$ value, then, if BS can negotiate without changing $T_{AI}$, accept the flow, otherwise drop the flow.

Else, if MAX_LATENCY for WLAN flows is violated because of the new $T_{AI}$ value, check if the BS can adjust the rate without changing $T_{AI}$ value, otherwise, drop the flow.

If no condition is violated, accept the flow.

7. If there are no more flows, output power saving parameters for WiMAX, otherwise, go to Step 6.
8. If a new traffic flow is added to the pool, go to Step 1.
9. If an existing traffic flow (that was supported) ends, then do nothing, since the QoS requirements are already being satisfied for the supported service/traffic flows.
10. Any synchronization requirements take precedence over the traffic flows.
   a. If WiMAX synch is required and the device is in WLAN mode, the device switches to WiMAX mode immediately.
   b. If WLAN synch is required and the device is in WiMAX mode and no synchronization is required in WiMAX, the device switches to WLAN mode.

For WiMAX power save classes, the parameters are:

Initial-sleep window: this value specifies the initial sleep time interval and it is valid for power saving class I and II.

Final-sleep window base: this value specifies the final sleep time window base and it is valid for power saving class I and III.

Listening window: this value specifies the listening time interval and it is valid for power saving class I and II.

Final-sleep window exponent: this value specifies the exponent associated with final-sleep window base and it is valid for power saving class I and III.

Start frame number for first sleep window: this value specifies the frame number at which the power save starts.

Traffic triggered wakening flag: this value specifies support for traffic triggering from the power save mode.

Based on these parameters, the controller 420 estimates the unavailable and available time intervals for the MS/STA operating in WiMAX mode and the Listen_interval for the MS/STA operating in WLAN mode as:

$$T_{UI} = \bigcup_i T_{UI}^i - \bigcap_{i,j,i \neq j} T_{AI}^j T_{UI}^i$$

$$T_{AI} = \bigcup_i T_{AI}^i$$

In some embodiments, the controller 420 also provisions traffic based on some or all of the power save class parameters described above.

Figure 12:
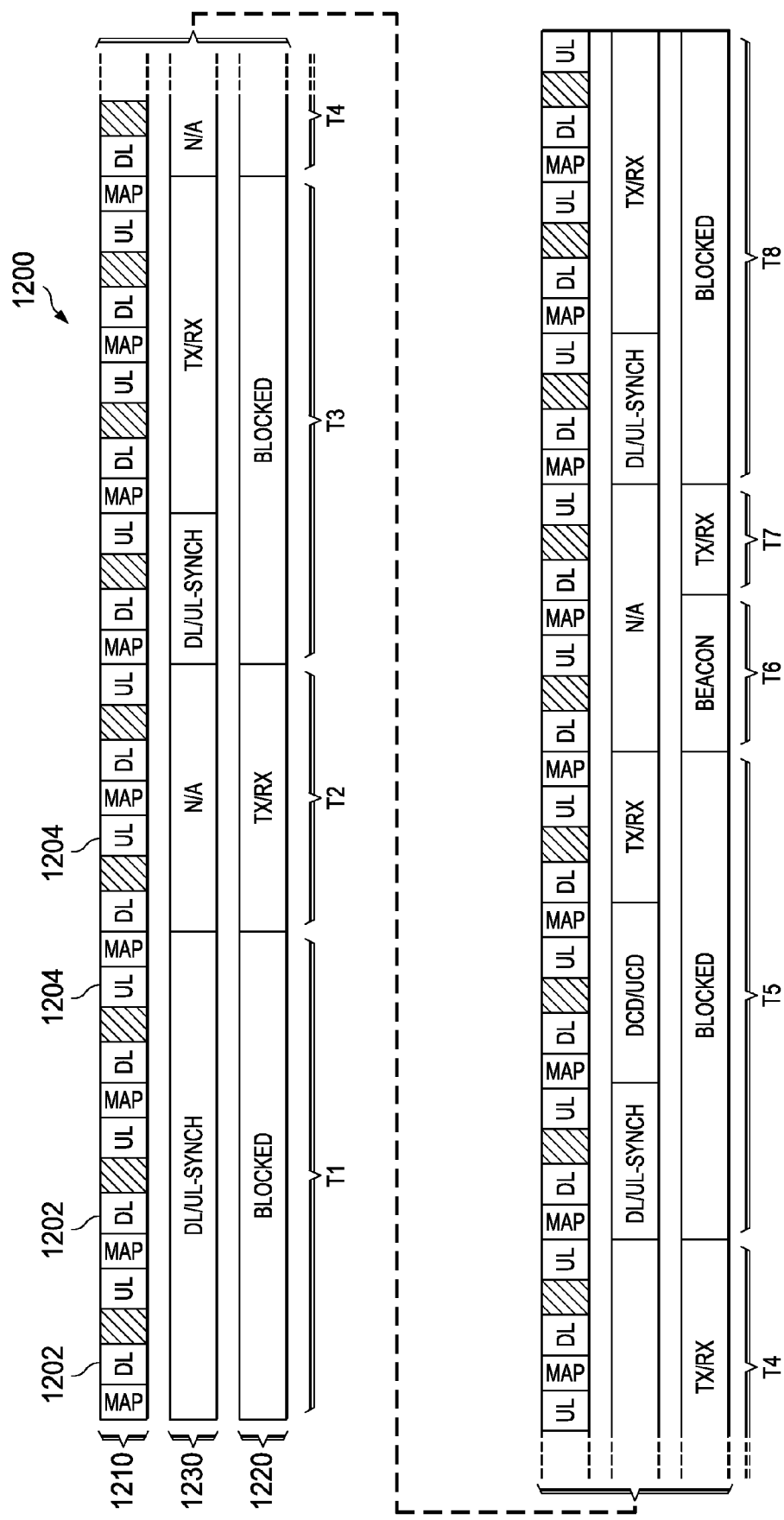
FIG. 12 illustrates a timing diagram for maintaining synchronization and QoS for two periodic flows.

FIG. 12 is a timing diagram 1200 for maintaining synchronization and QoS for two periodic traffic flows. In the timing diagram 1200, WiMAX frames 1210 comprise alternating downlink frames 1202 and uplink frames 1204. Meanwhile, WLAN synchronization and communication operations 1020 and WiMAX synchronization and communication operations 1030 occur during different time periods T1-T8. In T1, T3, T5 and T8, WiMAX synchronization and communications occur while WLAN operations are blocked. In T2, T4, and T7, WLAN communications occurs without regard to WiMAX operations. In T6, a WLAN Beacon is received during WLAN operations without regard to WiMAX operations. The timing diagram 1200 is not intended to limit WiMAX/WLAN synchronization and communication operations and simply illustrates that various WiMAX/WLAN synchronization and communication options are possible.

Figure 13:
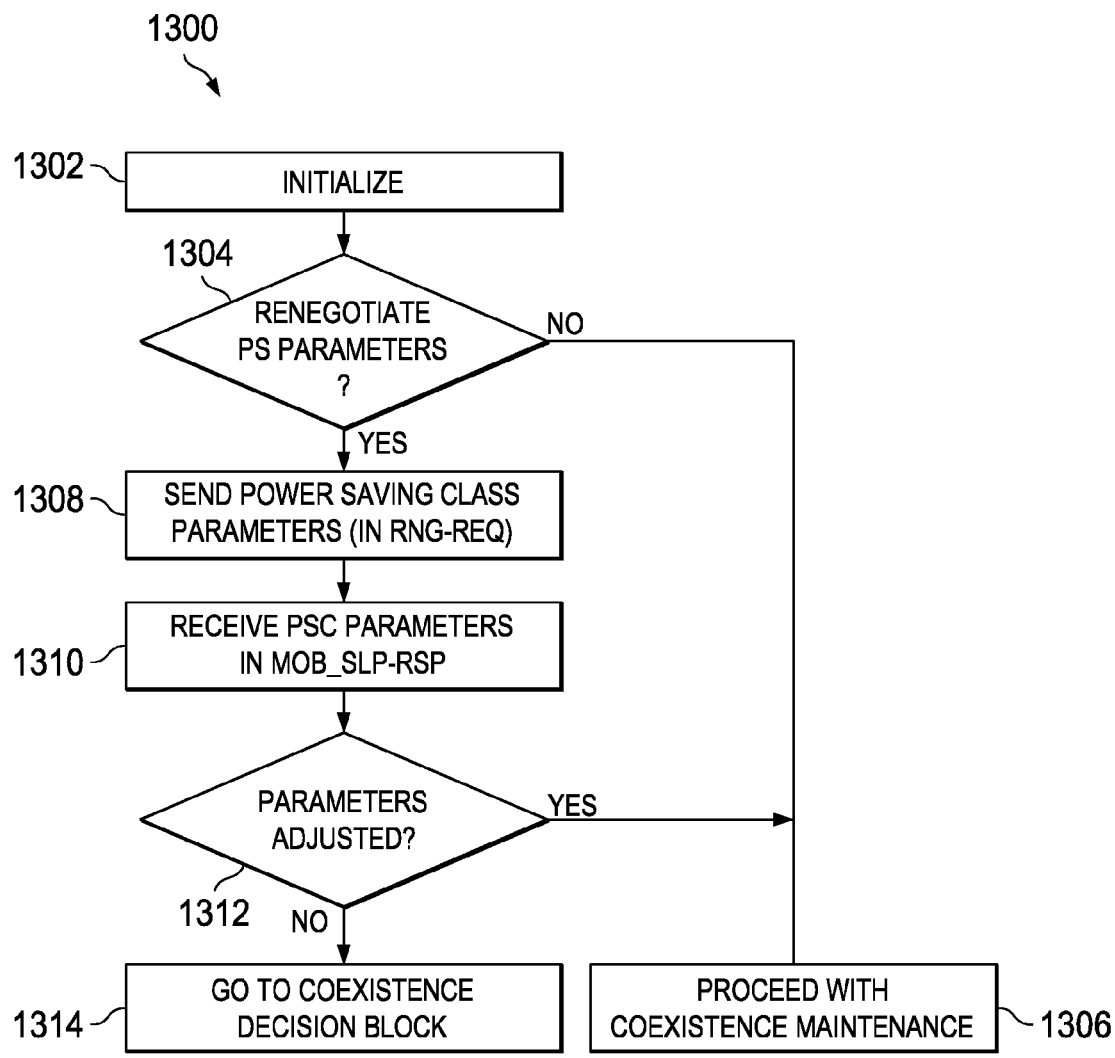
FIG. 13 illustrates an algorithm for negotiating power save parameters in accordance with embodiments.

FIG. 13 shows an algorithm 1300 for negotiating power save parameters in accordance with embodiments. The algorithm 1300 begins at block 1302 with initialization. If power save (PS) parameters are not renegotiated (decision block 1304), the algorithm 1300 proceeds with coexistence maintenance (block 1306). If PS parameters are renegotiated (decision block 1304), power save class parameters are sent (block 1308) and received (block 1310). In at least some embodiments, power save class parameters are sent using a ranging request (RNG-REQ) and are received using a mobile sleep response (MOB_SLP-RSP). If PS parameters are adjusted (decision block 1312), the algorithm 1300 proceeds with coexistence maintenance at block 1306. If PS parameters are not adjusted (decision block 1312), the algorithm 1300 proceeds to a coexistence decision block 1314. For example, at block 1314, the algorithm 1300 may determine whether coexistence is possible and, if so, the parameters that should be adjusted.

Figure 14A:
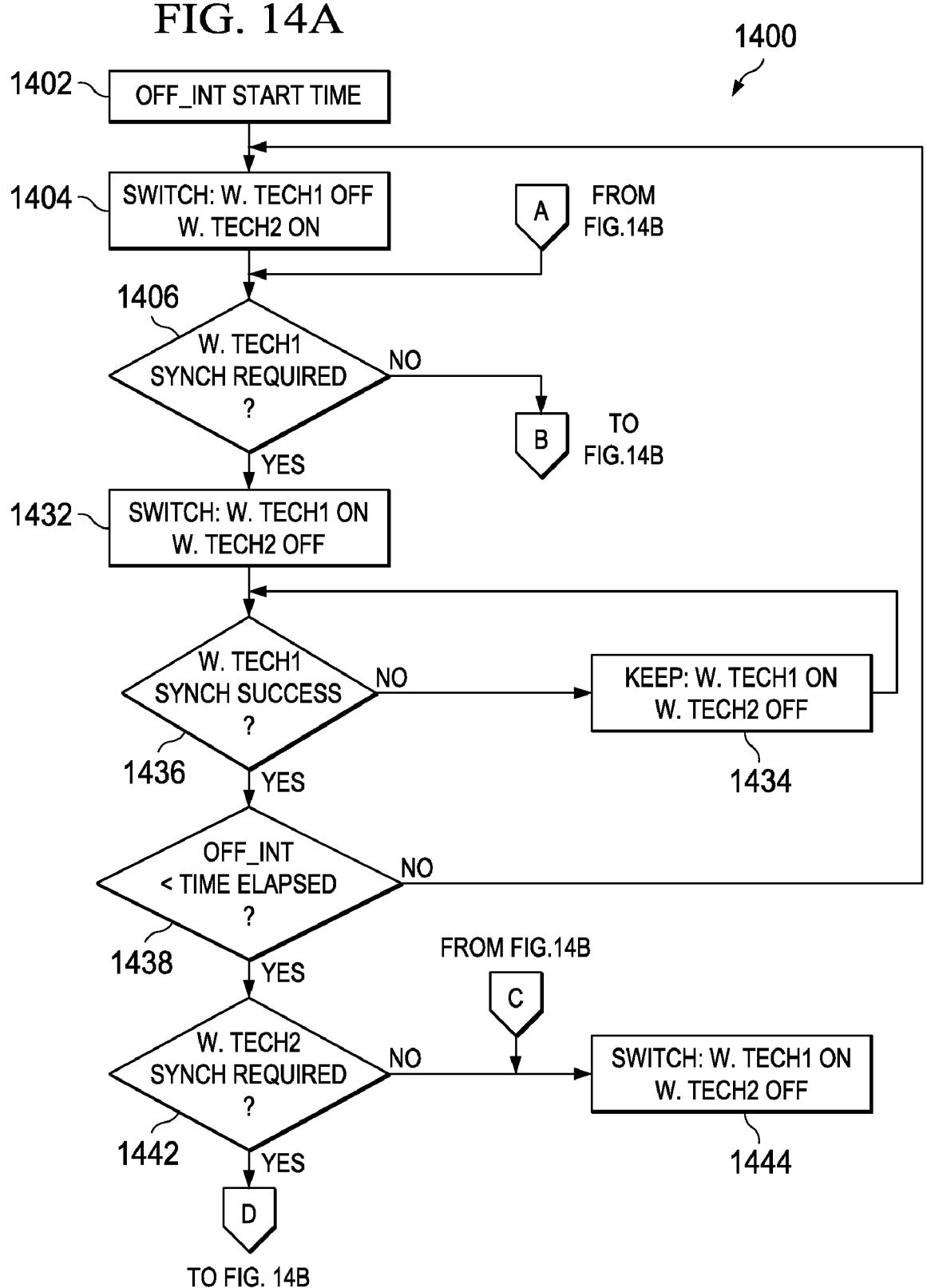
FIG. 14 illustrates an algorithm for managing "off" intervals in accordance with embodiments.
Figure 14B:
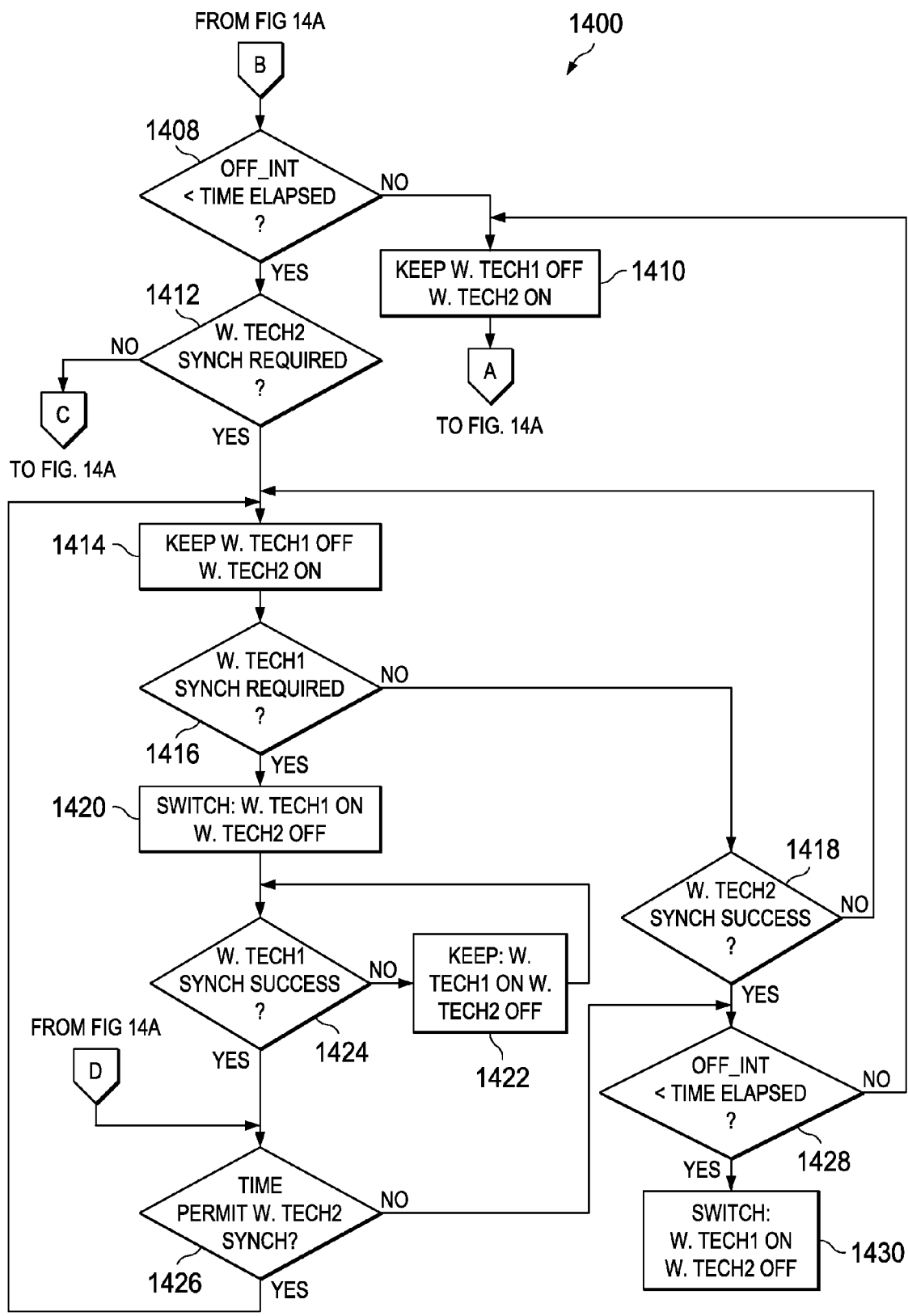

FIG. 14 shows an algorithm 1400 for managing "off" intervals in accordance with embodiments. The algorithm 1400 may be implemented, for example, by the controller 420. As shown, the algorithm 1400 begins with an "off" interval start time (block 1402). At block 1404, a first network technology is switched "off" and a second network technology is switched "on". If synchronization for the first network technology is required (decision block 1406), the first wireless technology is switched "on" and the second network technology is switched "off" (block 1432). If synchronization for the first network technology is not successful (decision block 1436), the first network technology stays "on" and the second network technology stays "off". If synchronization for the first network technology is successful (decision block 1436), the algorithm 1400 determines if the "off" interval is less than an elapsed time threshold (decision block 1438). If not, the first network technology stays "off" and the second network technology stays "on" (block 1440). If the "off" interval is less than the elapsed time threshold (decision block 1438), the algorithm 1400 determines if synchronization for the second network technology is required (decision block 1442). If not, the first network technology is switched "on" and the second network technology is switched "off" (block 1444).

If synchronization for the second network technology is required (decision block 1442), the first network technology stays "off" and the second network technology stays "on" (block 1414). The algorithm 1400 also proceeds to block 1414 if synchronization for the first network technology is not required (decision block 1406), if the "off" interval is less than the elapsed time threshold (decision block 1408), and if synchronization for the second network technology is required (decision block 1412). If the "off" interval is not less than the elapsed time threshold (decision block 1408), the first network technology stays "off" and the second network technology stays "on" (block 1410). Also, if synchronization for the second network technology is not required (decision block 1412), the first network technology is switched "on" and the second network technology is switched "off" (block 1444).

From block 1414, the algorithm 1400 determines if synchronization for the first network technology is required (decision block 1416). If so, the first network technology is switched "on" and the second network technology is switched "off" (block 1420). If the synchronization for the first network technology is not successful (decision block 1424), the first network technology stays "on" and the second network technology stays "off" (block 1422). Alternatively, if the synchronization for the first network technology is successful (decision block 1424), the algorithm 1400 determines if there is time to synchronize the second network technology (decision block 1426). If so, the algorithm 1400 returns to block 1414. If not, the algorithm 1400 determines if the "off" interval is less than the elapsed time threshold (decision block 1428). If so, the first network technology is switched "on" and the second network technology is switched "off" (block 1430). If not, the first network technology stays "off" and the second network technology stays "on" (block 1410). It should that noted that managing "off" intervals may involve other control parameters (e.g., power save parameters) besides synchronization parameters.

Figure 15B:
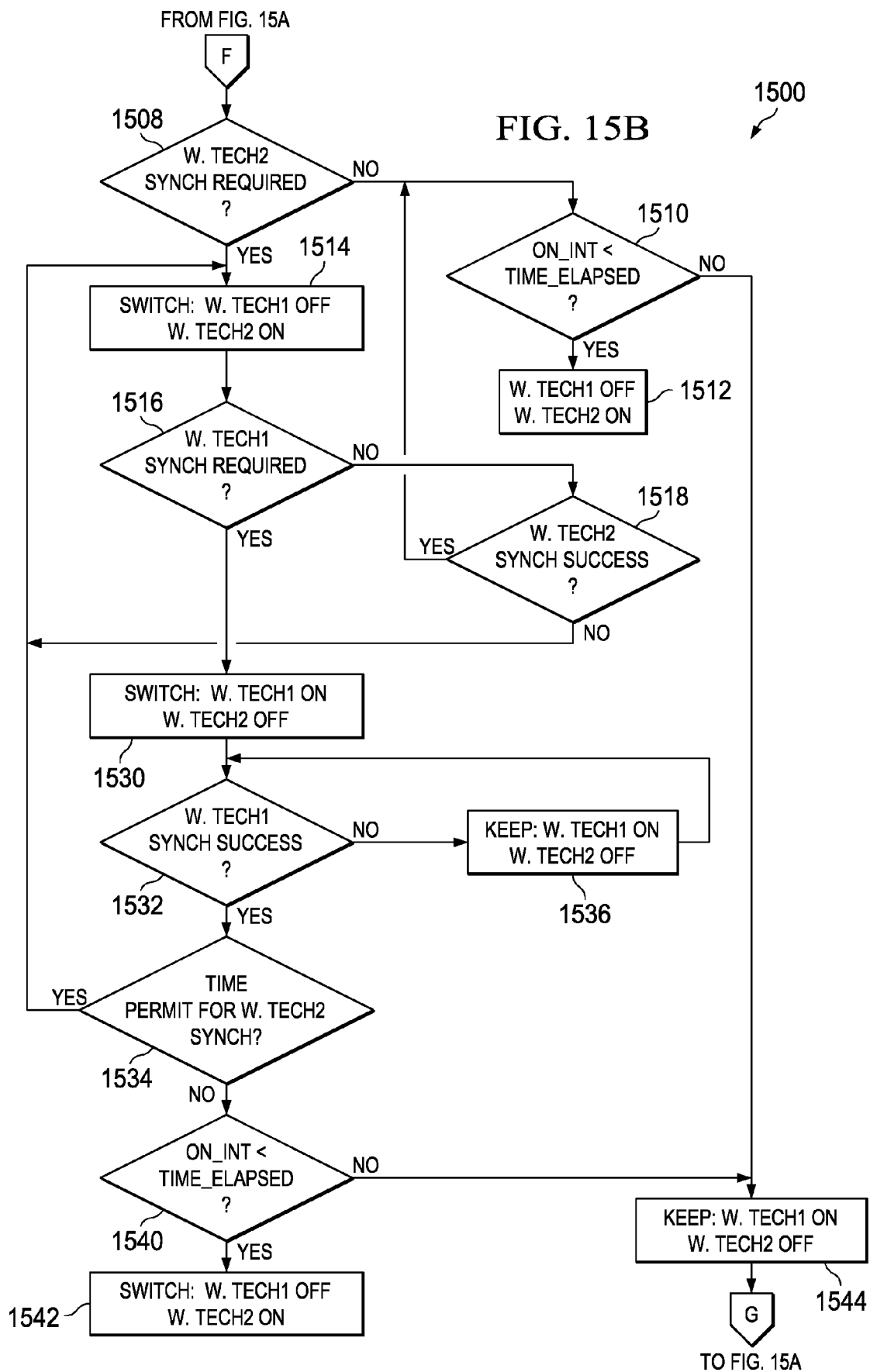
FIG. 15 illustrates an algorithm for managing "on" intervals in accordance with embodiments.

FIG. 15 shows an algorithm 1500 for managing "on" intervals in accordance with embodiments. The algorithm 1500 may be implemented, for example, by the controller 420. As shown, the algorithm 1500 begins with an "on" interval start time (block 1502). At block 1504, a first network technology is switched "on" and a second network technology is switched "off". If synchronization for the first network technology is required (decision block 1506), the first wireless technology stays "on" and the second network technology stays "off" (block 1520). If synchronization for the first network technology is not successful (decision block 1522), the first network technology stays "on" and the second network technology stays "off" (block 1520). If synchronization for the first network technology is successful (decision block 1522), the algorithm 1500 determines if the "on" interval is less than an elapsed time threshold (decision block 1524). If not, the first network technology stays "on" and the second network technology stays "off" (block 1538). If the "on" interval is less than the elapsed time threshold (decision block 1524), the first network technology is switched "off" and the second network technology is switched "on" (block 1526).

Returning to decision block 1506, if synchronization for the first network technology is not required, the algorithm 1500 determines if synchronization for the second network technology is required (decision block 1508). If not, the algorithm 1500 determines if the "on" interval is less than an elapsed time threshold (decision block 1510). If not, the first network technology stays "on" and the second network technology stays "off" (block 1544). If so, the first network technology is switched "off" and the second network technology is switched "on" (block 1512).

Returning to decision block 1508, if synchronization for the second network technology is required, the first network technology is switched "off" and the second network technology is switched "on" (block 1514). The algorithm 1500 then determines if synchronization for the first network technology is required (decision block 1516). If not, the algorithm 1500 determines if synchronization for the second network technology is successful (decision block 1518). If so, the algorithm 1500 proceeds to decision block 1510. If not, the algorithm 1500 proceeds to decision block 1534. The algorithm 1500 also proceeds to decision block 1534 if synchronization for the first network technology is required (decision block 1516) and if synchronization for the first network technology is successful (decision block 1532). If synchronization for the first network technology is required at decision block 1516, the first network technology is switched "on" and the second network technology is switched "off" (block 1530) before proceeding to decision block 1532. Also, if synchronization for the first network technology is not successful (decision block 1532), the first network technology stays "on" and the second network technology stays "off" (block 1536). At decision block 1534, the algorithm 1500 determines if time permits synchronization for the second network technology. If so, the algorithm 1500 proceeds to block 1514. If not, the algorithm 1500 proceeds to decision block 1540. It should that noted that managing "on" intervals may involve other control parameters (e.g., power save parameters) besides synchronization parameters.

FIG. 16 shows an algorithm 1600 for service flow management in accordance with embodiments. The algorithm 1600 begins at block 1602 with initialization. If there is not a new service flow (decision block 1604), algorithm 1600 proceeds with coexistence maintenance at block 1606. If there is a new service flow (decision block 1604), power save parameters are estimated (block 1608) and delays are estimated (block 1610). If a delay is less than a maximum delay (determination block 1612), the algorithm 1600 determines whether power save parameter negotiations occur (decision block 1614). If there are no negotiations (decision block 1614) or if negotiations are successful (decision block 1616), the service flow is accepted (block 1618). If there are negotiations (decision block 1614) and if negotiations are not successful (decision block 1616), the service flow is dropped (block 1622).

Returning to decision block 1612, if the delay is not less than a maximum delay (i.e., the delay is more than a maximum delay), the algorithm 1620 determines if the service flow is high priority (decision block 1620). If not, the service flow is dropped (block 1622). If so, the lowest ranked service flow is removed (block 1624) and the algorithm 1600 proceeds to block 1608.

Figure 17:
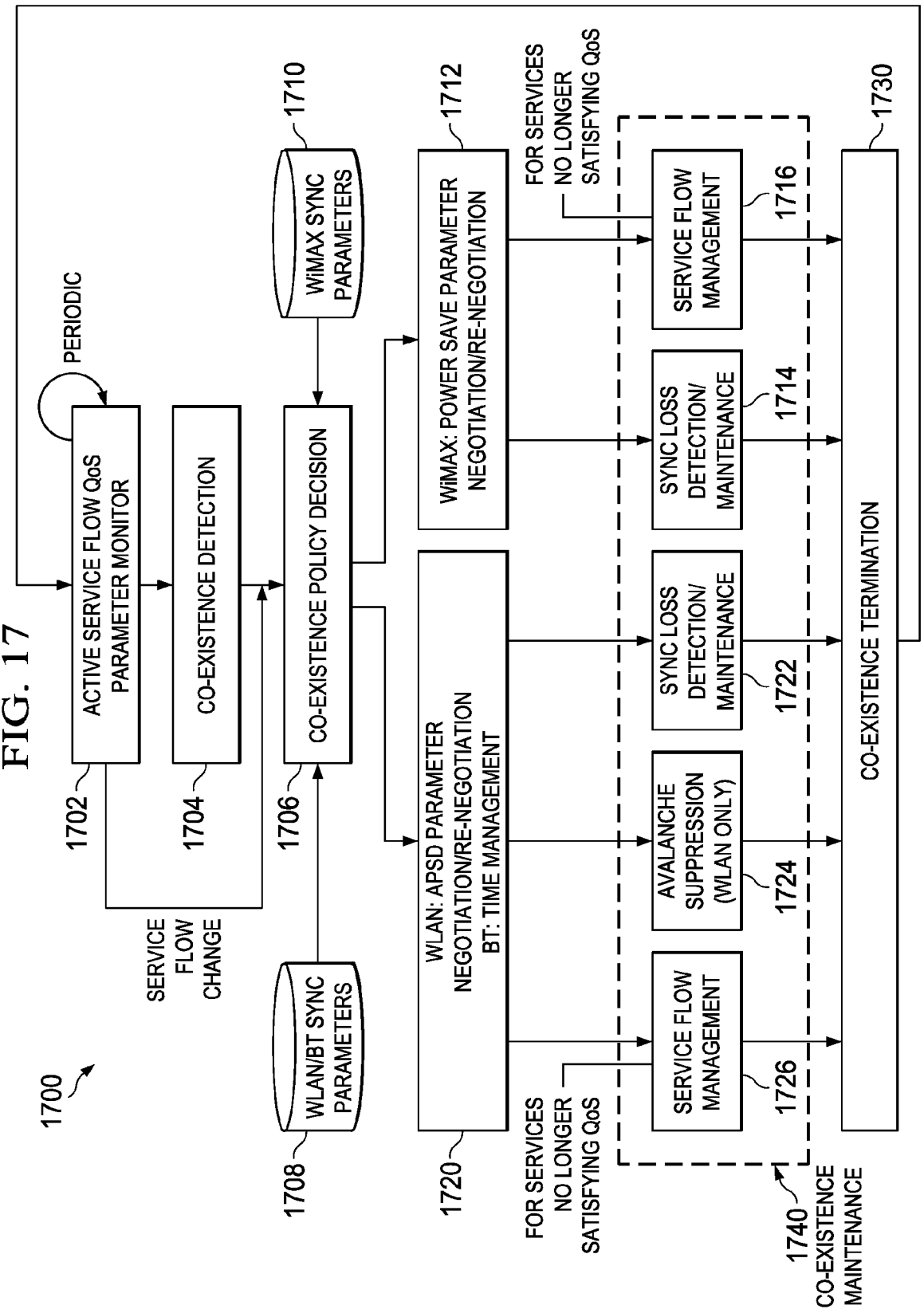
FIG. 17 illustrates a coexistence decision algorithm in accordance with embodiments coexistence decision algorithm.

FIG. 17 shows a coexistence decision algorithm 1700 in accordance with embodiments. The algorithm 1700 may be implemented, for example, by the controller 420. The algorithm 1700 begins by periodically monitoring active service flow QoS parameters (e.g., PER) at block 1702. Coexistence detection occurs at block 1704 and coexistence policy decisions are made at block 1706. In at least some embodiments, coexistence policy decisions at block 1706 are based on service flow change information determined at block 1702. In WiMAX/WLAN embodiments, the coexistence policy decisions of block 1706 are also based on synchronization parameters provided by a WLAN/BT sync parameter database 1708 and a WiMAX sync parameter database 1710.

In at least some embodiments, the algorithm 1700 performs power save parameter negotiations/re-negotiations for WiMAX communications at block 1712. Also, the algorithm 1700 performs automatic power save delivery (APSD) parameter negotiations/re-negotiations for WLAN at block 1720. The algorithm 1700 also may perform time management for BT at block 1720.

At block 1740, the algorithm maintains coexistence based on service flow management (blocks 1716 and 1726), avalanche suppression (WLAN only) (block 1724), synchronization loss detection and maintenance (blocks 1714 and 1722). Finally, the algorithm selectively terminates coexistence at block 1730.

Figure 18:
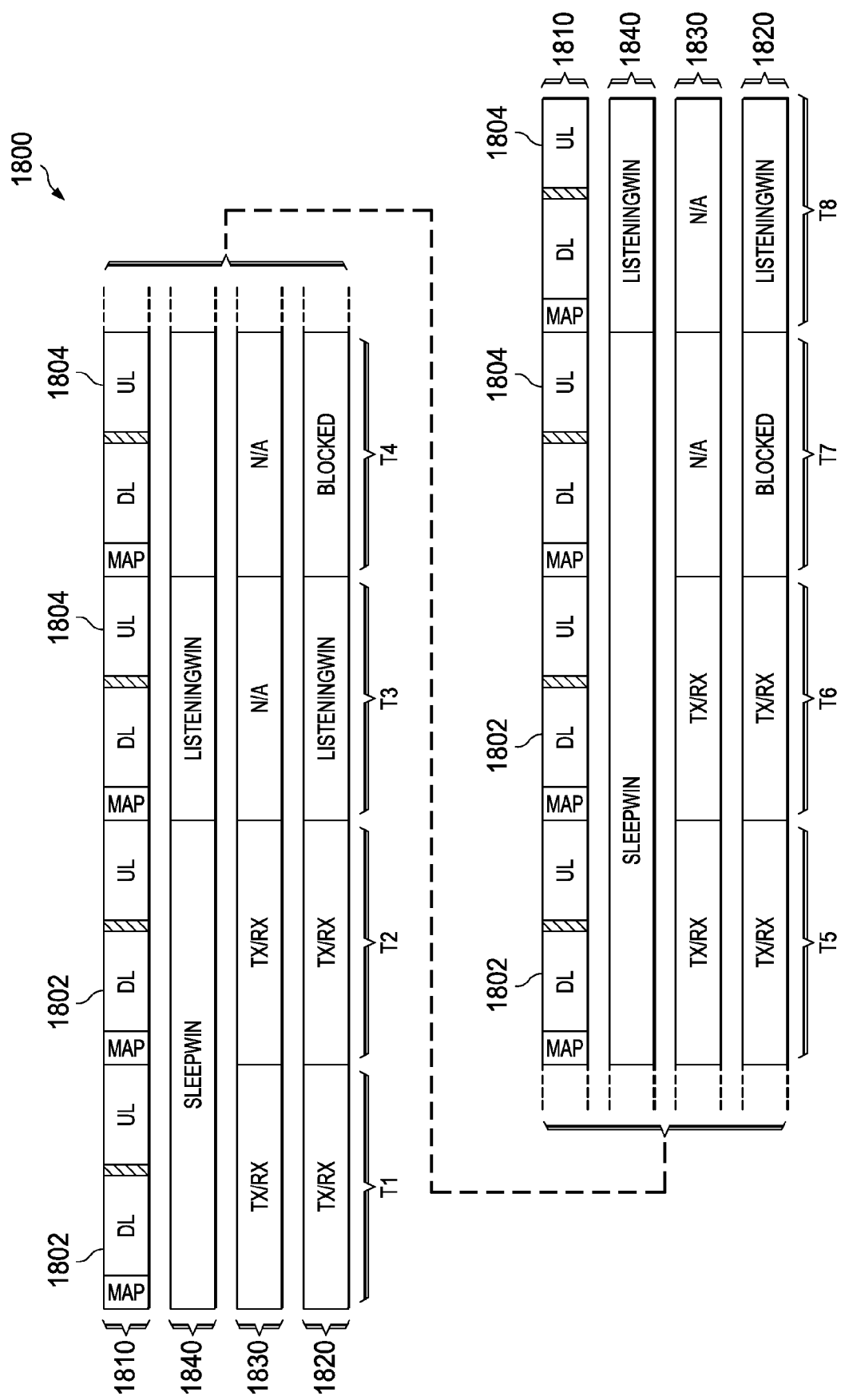
FIG. 18 illustrates a timing diagram showing best effort (BE) and unsolicited grant service (UGS) traffic and WiMAX operations if sleepWin is not constant in accordance with embodiments.

FIG. 18 illustrates a timing diagram 1800 showing BE and UGS traffic and WiMAX operations if sleepWin is not constant in accordance with embodiments. In the timing diagram 1800, WiMAX frames 1810 comprise alternating downlink frames 1802 and uplink frames 1804. Meanwhile, various BE operations 1840, UGS operations 1830 and WiMAX mode operations 1820 correspond to different time periods T1-T8. In T1, T2, T5, and T6, BE operations 1840 are blocked while UGS operations 1830 and WiMAX mode operations 1820 correspond to transmission and reception operations. In T3 and T8, BE operations 1840 and WiMAX mode operations 1820 correspond to a ListeningWin operations without regard to UGS operations 1830. In T4 and T7, BE operations 1840 correspond to sleepWin operations without regard to WiMAX UGS operations 1830 and WiMAX mode operations 1820 are blocked.

Figure 19:
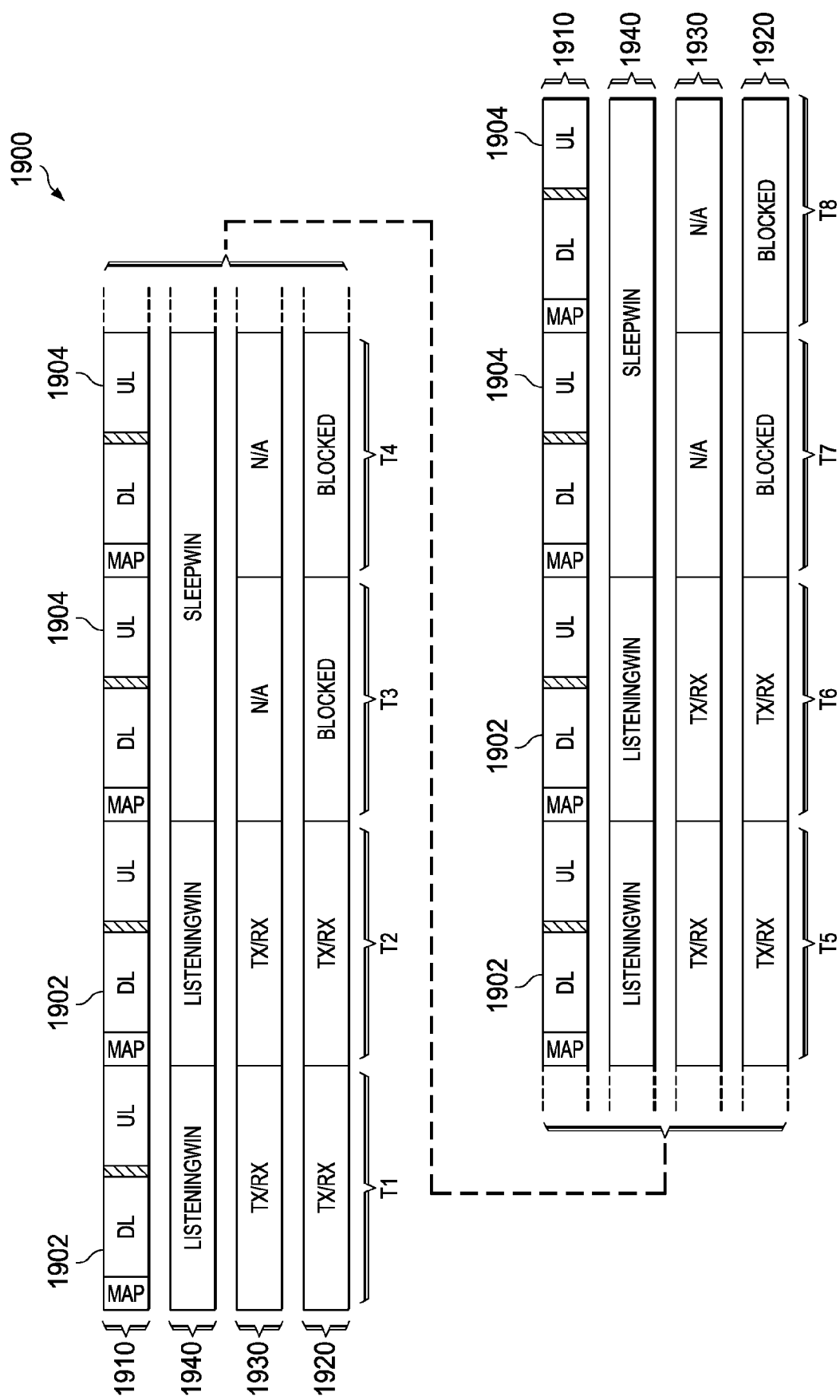
FIG. 19 illustrates a timing diagram showing WiMAX operations after sleepWin and initialWin for BE are fixed in accordance with embodiments.

FIG. 19 illustrates a timing diagram 1900 showing WiMAX operations after sleepWin and initialWin for BE are fixed in accordance with embodiments. In the timing diagram 1900, WiMAX frames 1910 comprise alternating downlink frames 1902 and uplink frames 1904. Meanwhile, various BE operations 1940, UGS operations 1930 and WiMAX mode operations 1920 correspond to different time periods T1-T8. In T1, T2, T5, and T6, BE operations 1940 correspond to a ListeningWin operation while UGS operations 1930 and WiMAX mode operations 1920 correspond to transmission and reception operations. In T3, T4, T7 and T8, BE operations 1940 correspond to sleepWin operations without regard to UGS operations 1930 and WiMAX mode operations 1920 are blocked.

Figure 20:
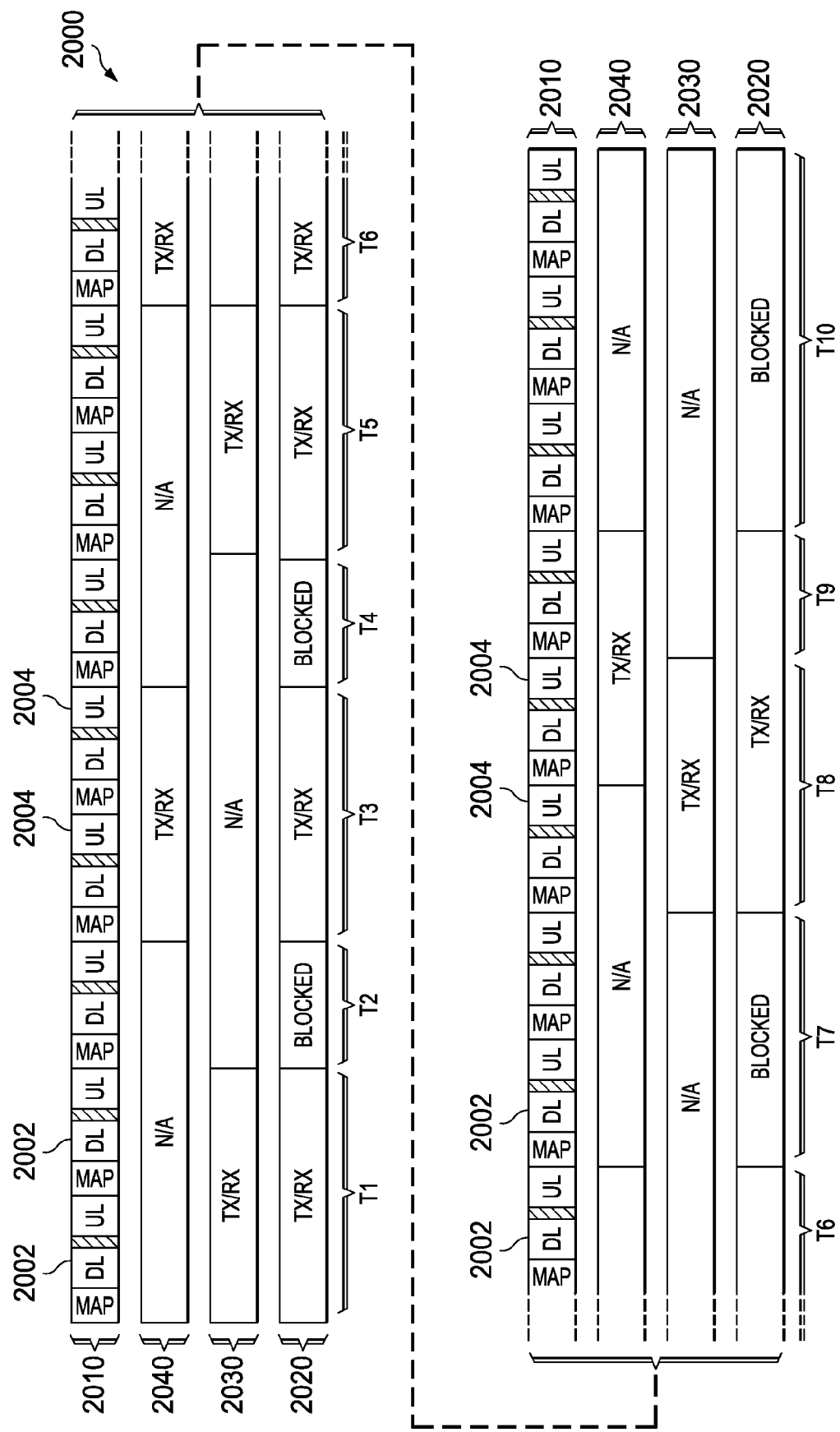
FIG. 20 illustrates a timing diagram showing real-time variable rate (rtVR) and UGS traffic and WiMAX operations in accordance with embodiments.

FIG. 20 illustrates a timing diagram 2000 showing rtVR and UGS traffic and WiMAX operations in accordance with embodiments. In the timing diagram 2000, WiMAX frames 2010 comprise alternating downlink frames 2002 and uplink frames 2004. Meanwhile, various rtVR operations 2040, UGS operations 2030 and WiMAX mode operations 2020 correspond to different time periods T1-T10. In T1 and T5, UGS operations 2030 and WiMAX mode operations 2020 correspond to transmission and reception operations without regard to rtVR operations 2040. In T3, T6, and T9, rtVR operations 2040 and WiMAX mode operations 2020 correspond to transmission and reception operations without regard to UGS operations 2030. In T2, T4, T7 and T10, WiMAX mode operations 2020 are blocked with rtVR operations 2040 and UGS operations 2030 being not applicable.

Figure 21:
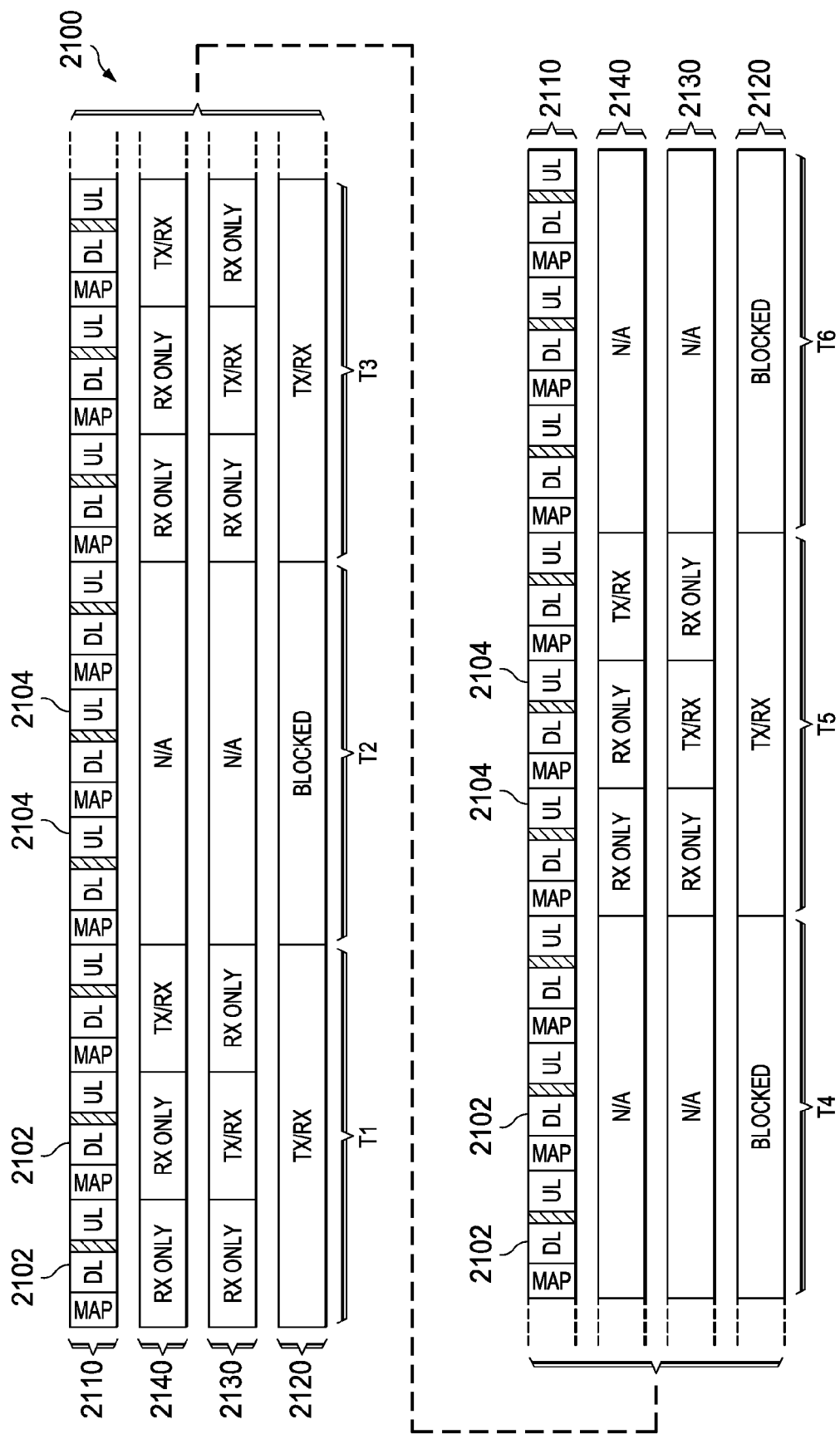
FIG. 21 illustrates a timing diagram showing changes to sleepWin and ListeningWin for UGS and rtVR traffic flows in accordance with embodiments.

FIG. 21 illustrates a timing diagram 2100 showing changes to sleepWin and ListeningWin for UGS and rtVR traffic flows in accordance with embodiments. In the timing diagram 2000, WiMAX frames 2110 comprise alternating downlink frames 2102 and uplink frames 2104. Meanwhile, various rtVR operations 2140, UGS operations 2130 and WiMAX mode operations 2120 correspond to different time periods T1-T6. In T1, T3, and T5, WiMAX mode operations 2120 correspond to receptions and transmission operations. Meanwhile, rtVR operations 2140 follow a reception/transmission pattern (e.g., RX only, RX only, TX/RX) and UGS operations 2130 follow another reception/transmission pattern (e.g., RX only, TX/RX, RX only). In T2, T4, and T6, WiMAX mode operations 2120 are blocked with rtVR operations 2140 and UGS operations 2130 being not applicable.

Figure 22:
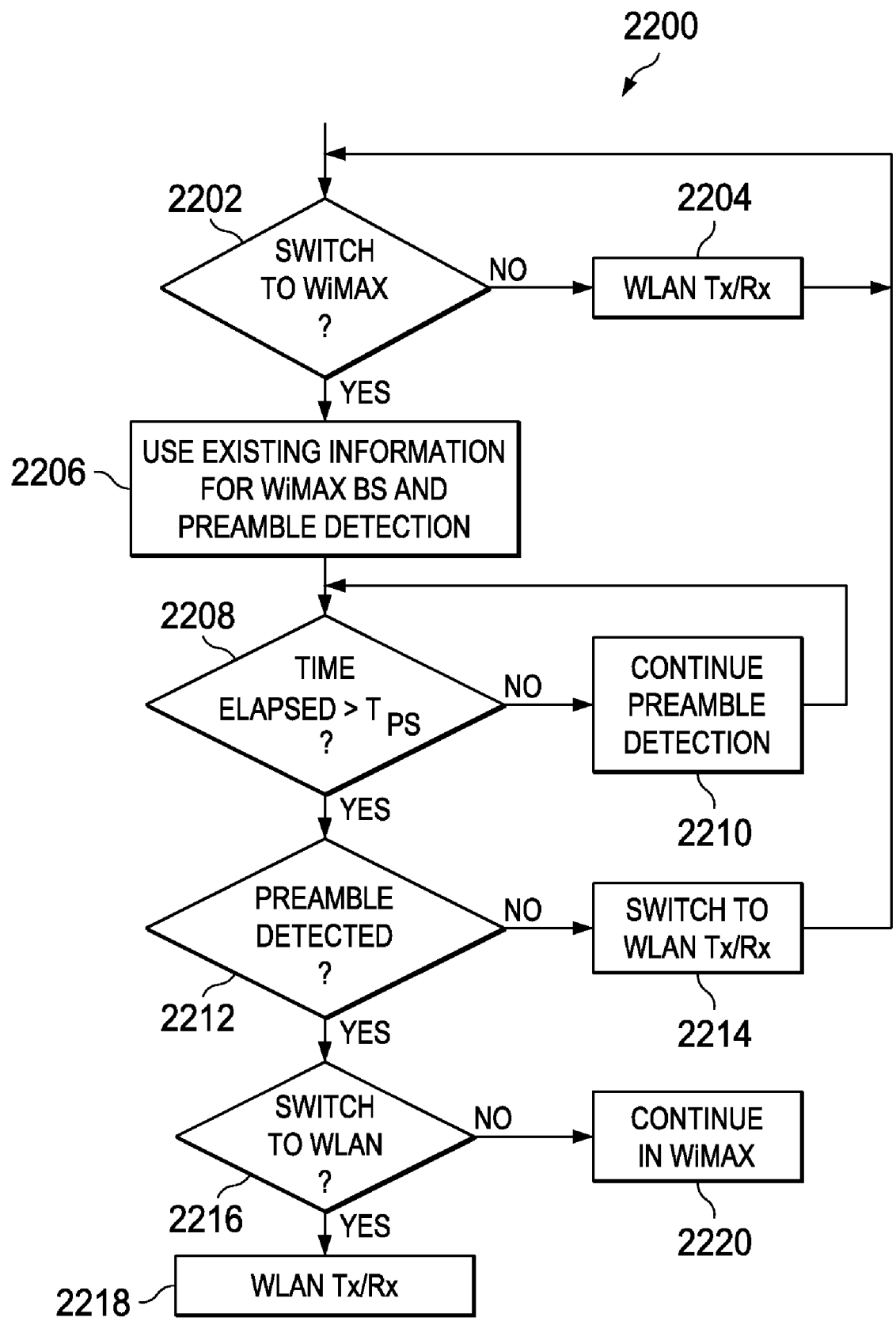
FIG. 22 illustrates an algorithm for preamble detection and BSS acquisition in WiMAX in accordance with embodiments.

FIG. 22 illustrates an algorithm 2200 for preamble detection and base station (BSS) acquisition in WiMAX in accordance with embodiments. As shown, the algorithm 2200 determines whether to switch to WiMAX (decision block 2202). If the switch does not occur (decision block 2202), WLAN transmission/reception occurs at block 2204 and the algorithm 2200 returns to decision block 2202. If the switch does occur (decision block 2202), the existing information for a corresponding WiMAX base station (BS) and preamble detection is used (block 2206). If less than a threshold amount of time passes (decision block 2208), preamble detection continues (block 2210). In at least some embodiments, the threshold amount of time corresponds to a power save parameter threshold ($T_{PS}$). If more than a threshold amount of time passes (decision block 2208), the algorithm 2200 determines if a preamble is detected (decision block 2212). If not, a switch to WLAN transmission/reception occurs (block 2214) and the algorithm 2200 returns to block 2202. If a preamble is detected (decision block 2212), the algorithm 2200 determines whether to switch to WLAN (decision block 2216) by proceeding to block 2218 or whether to continue in WiMAX by proceeding to block 2220.

Figure 23:
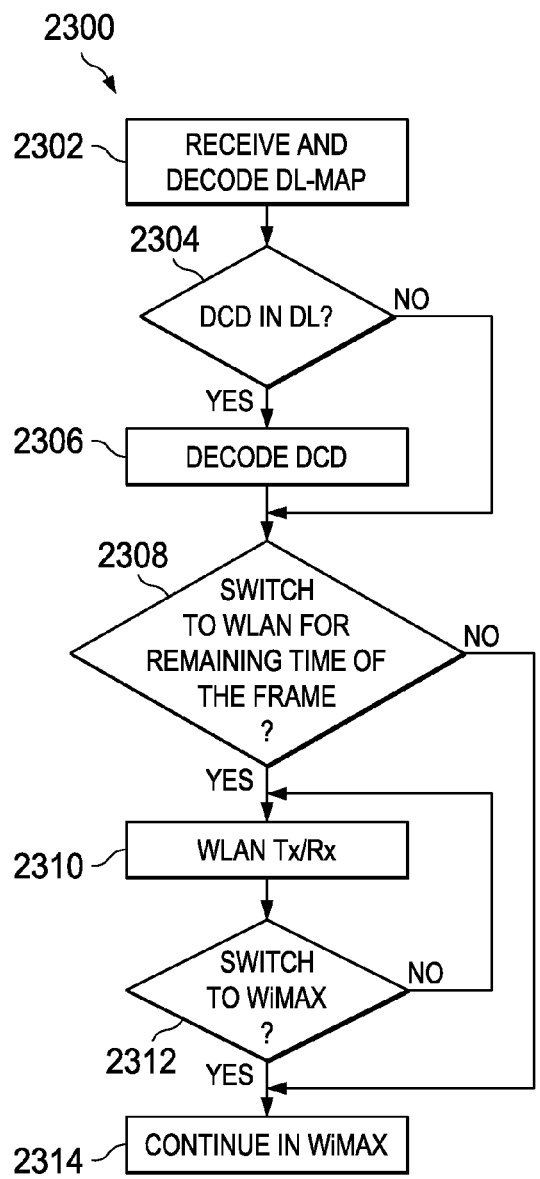
FIG. 23 illustrates an algorithm for downlink (DL) synchronization in accordance with embodiments.

FIG. 23 illustrates an algorithm 2300 for DL synchronization in accordance with embodiments. As shown, the algorithm 2300 receives and decodes a DL-MAP (block 2302). If a downlink channel description (DCD) is included with the DL-MAP (decision block 2304), the DCD is decoded (block 2306). At decision block 2308, the algorithm 2300 determines whether to switch to WLAN for the remainder of the frame. If the switch occurs (decision block 2308), WLAN transmission/reception occurs at block 2310. Unless a switch is made to WiMAX (decision block 2312), WLAN transmission/reception continues at block 2310. If a switch is made WiMAX (decision block 2312) or if a switch was never made to WLAN (decision block 2308), the algorithm 2300 proceeds with WiMAX operations (block 2314).

Figure 24:
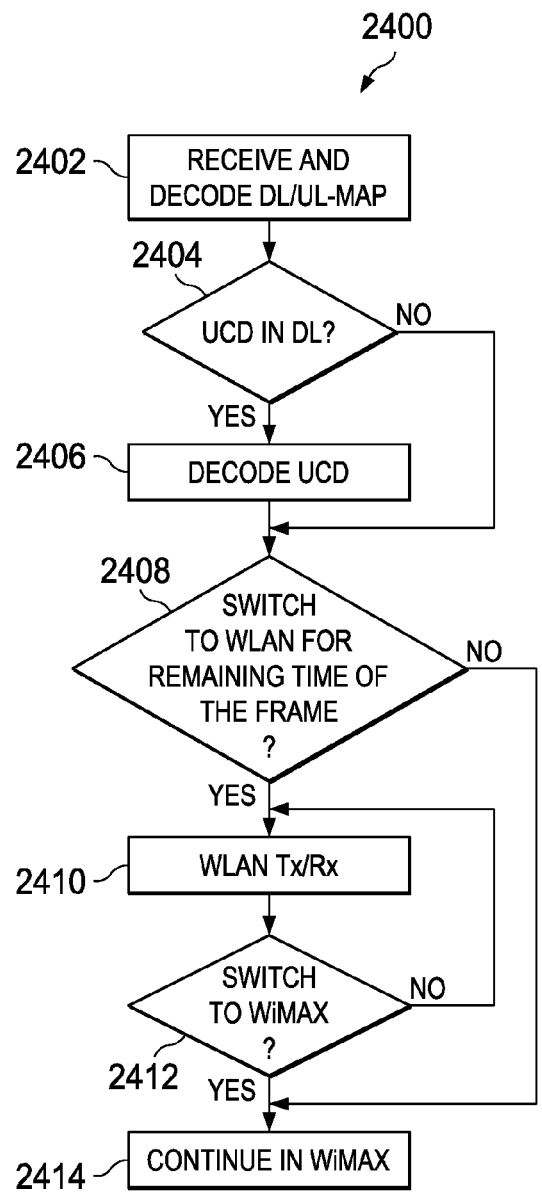
FIG. 24 illustrates an algorithm for uplink (UL) synchronization in accordance with embodiments.

FIG. 24 illustrates an algorithm 2400 for UL synchronization in accordance with embodiments. As shown, the algorithm 2400 comprises receiving and decoding a DL/UL-MAP (block 2402). If an uplink channel description (UCD) is included with the DL/UL-MAP (decision block 2404), the UCD is decoded (block 2406). At decision block 2408, the algorithm 2400 determines whether to switch to WLAN for the remainder of the frame. If the switch occurs (decision block 2408), WLAN transmission/reception occurs at block 2410. Unless a switch is made to WiMAX (decision block 2412), WLAN transmission/reception continues at block 2410. If a switch is made WiMAX (decision block 2412) or if a switch was never made to WLAN (decision block 2408), the algorithm 2400 proceeds with WiMAX operations at block 2414.

Figure 25:
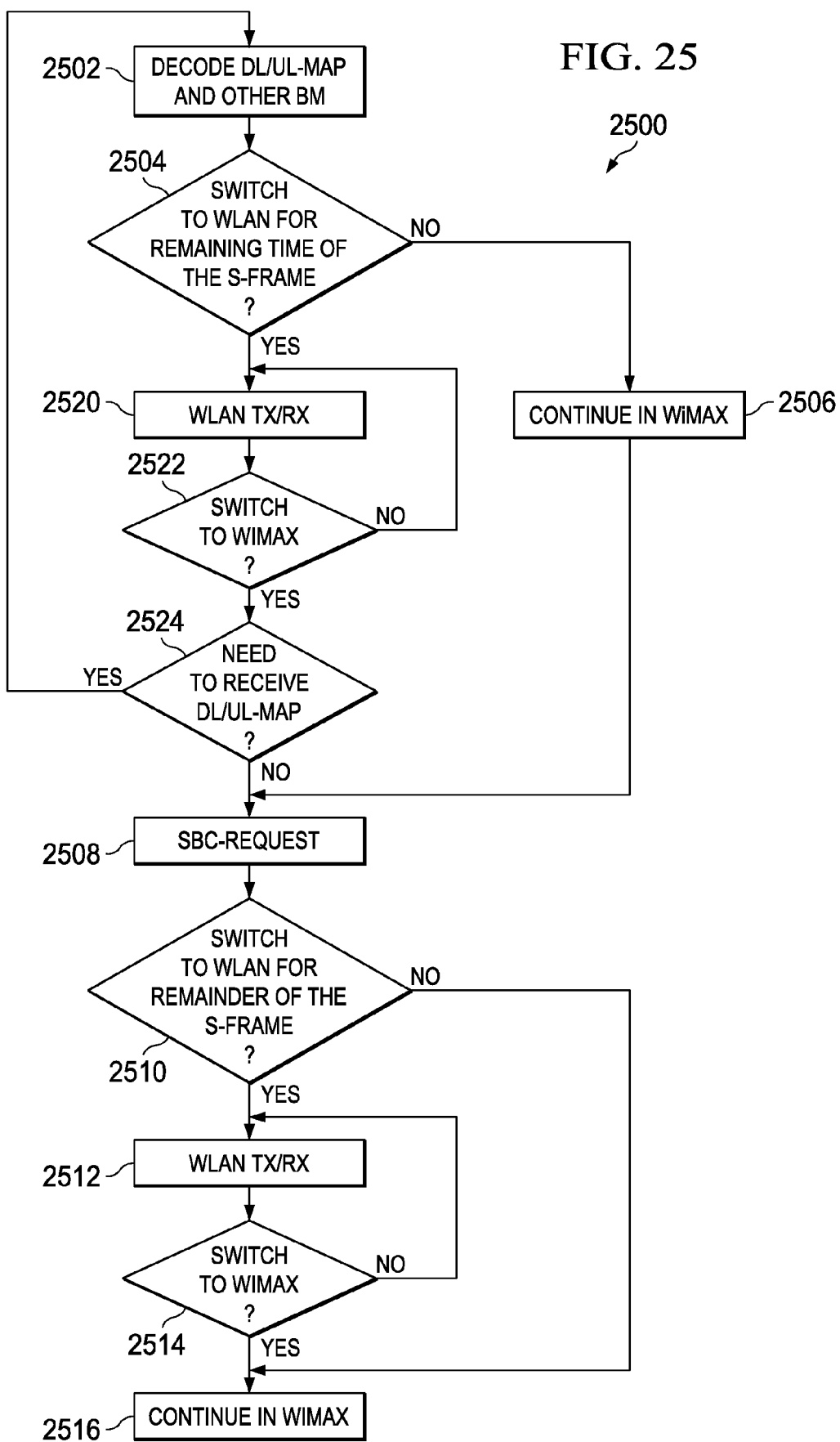
FIG. 25 illustrates an algorithm for a subscriber station basic capability (SBC) request in accordance with embodiments.

FIG. 25 illustrates an algorithm 2500 for a subscriber station basic capability (SBC) request in accordance with embodiments. As shown, the algorithm 2500 involves receiving and decoding a DL/UL-MAP and other broadcast messages (BM) (block 2502). At decision block 2504, the algorithm 2500 determines whether to switch to WLAN for the remainder of the s-frame. If the switch occurs (decision block 2504), WLAN transmission/reception occurs at block 2520. Unless a switch is made to WiMAX (decision block 2522), WLAN transmission/reception continues at block 2520. If a switch is made to WiMAX (decision block 2522), the algorithm 2500 determines if reception of another DL/UL-map is needed (decision block 2524). If so, the algorithm 2500 returns to block 2502. Otherwise, the algorithm 2500 proceeds to an SBC request at block 2508. The algorithm 2500 also arrives to block 2508 if there is no switch to WLAN at decision block 2504 with WiMAX continuing at block 2506. From block 2508, the algorithm 2500 determines whether to switch to WLAN for the remainder of the s-frame (decision block 2510). If the switch occurs (decision block 2510), WLAN transmission/reception occurs at block 2512. Unless a switch is made to WiMAX (decision block 2514), WLAN transmission/reception continues at block 2512. If a switch is made to WiMAX (decision block 2514) or if a switch was never made to WLAN (decision block 2510), the algorithm 2500 proceeds with WiMAX operations at block 2516.

Figure 26:
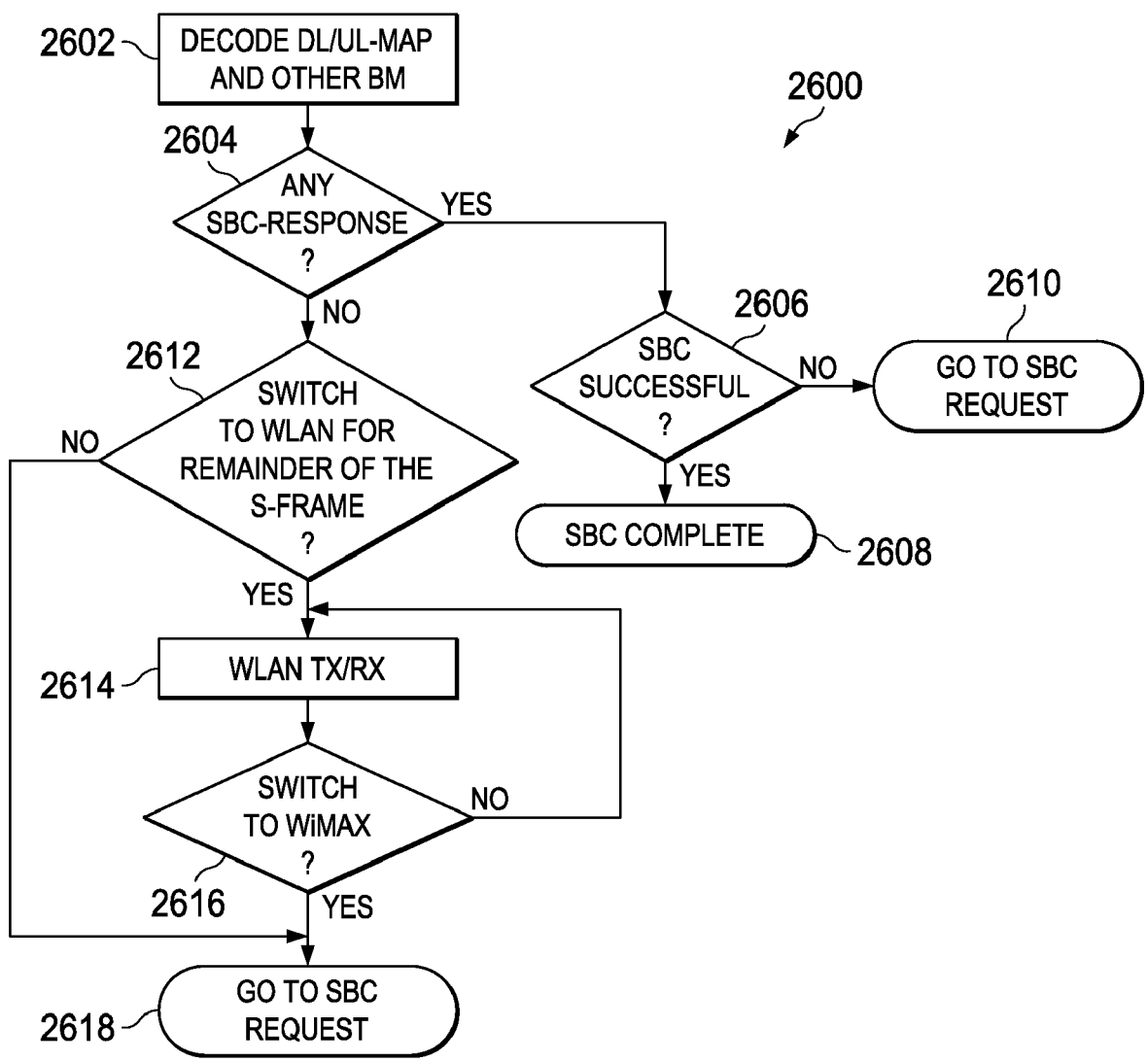
FIG. 26 illustrates an algorithm for an SBC response in accordance with embodiments.

FIG. 26 illustrates an algorithm 2600 for an SBC response in accordance with embodiments. As shown, the algorithm 2600 involves receiving and decoding a DL/UL-MAP and other BM (block 2602). At decision block 2604, the algorithm 2600 determines whether there is any SBC response. If so, the algorithm 2600 determines if the SBC is successful (decision block 2606). If the SBC is successful (decision block 2606), the SBC is complete (block 2608). Otherwise, the algorithm 2600 proceeds to an SBC request at block 2610 (e.g., the algorithm 2500 of FIG. 25).

If there is no SBC response (decision block 2604), the algorithm 2600 determines whether to switch to WLAN for the remainder of the s-frame decision block 2612). If the switch occurs (decision block 2612), WLAN transmission/reception occurs at block 2614. Unless a switch is made to WiMAX (decision block 2616), WLAN transmission/reception continues at block 2614. If a switch is made to WiMAX (decision block 2616) or if a switch was never made to WLAN (decision block 2612), the algorithm 2600 proceeds to an SBC request at block 2618 (e.g., the algorithm 2500 of FIG. 25).

Figure 27:
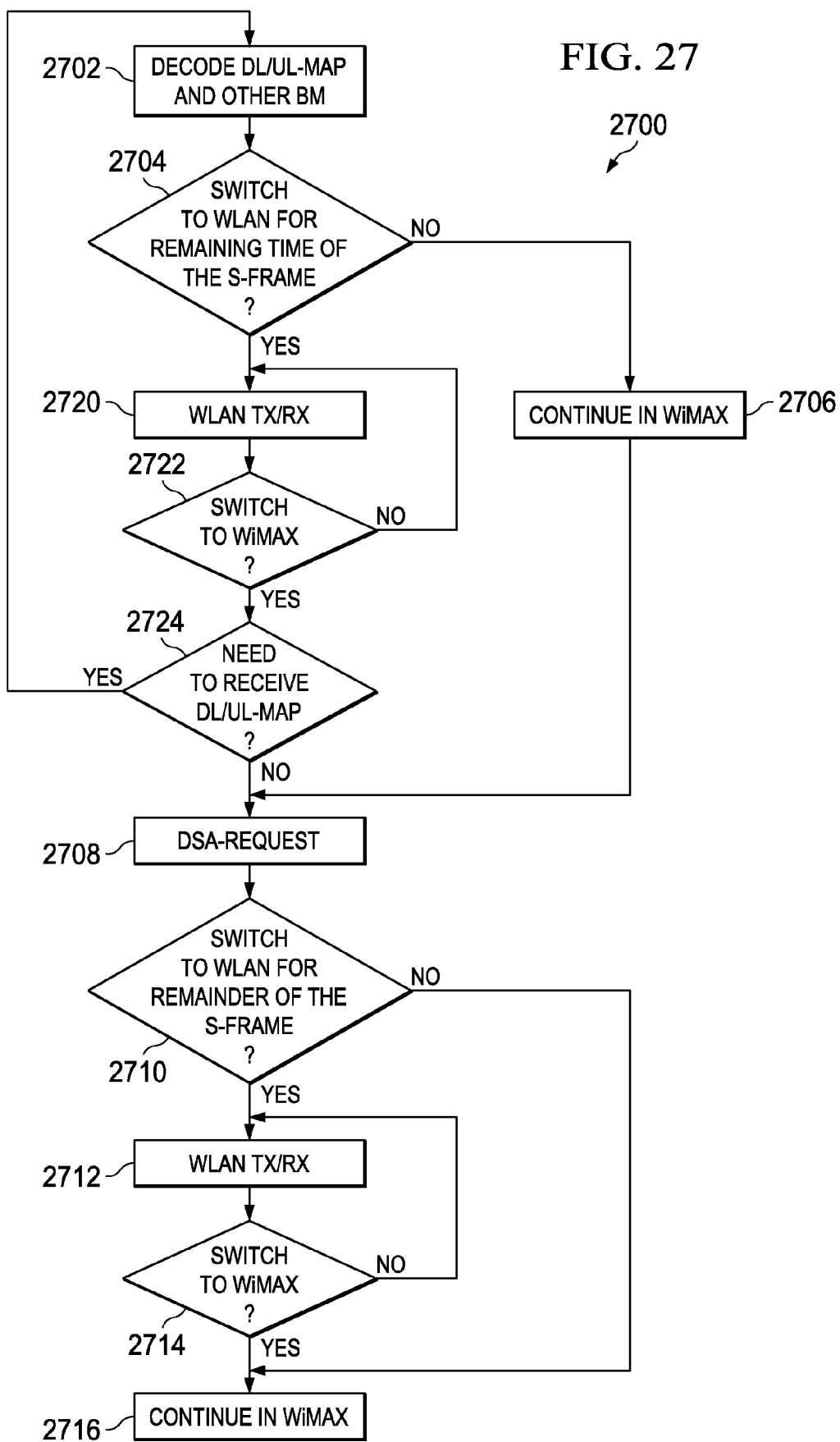
FIG. 27 illustrates an algorithm for a dynamic service addition (DSA) request in accordance with embodiments.

FIG. 27 illustrates an algorithm 2700 for a dynamic service addition (DSA) request in accordance with embodiments. As shown, the algorithm 2700 involves receiving and decoding a DL/UL-MAP and other BM (block 2702). At decision block 2704, the algorithm 2700 determines whether to switch to WLAN for the remainder of the s-frame. If the switch occurs (decision block 2704), WLAN transmission/reception occurs at block 2720. Unless a switch is made to WiMAX (decision block 2722), WLAN transmission/reception continues at block 2720. If a switch is made to WiMAX (decision block 2722), the algorithm 2700 determines if reception of another DL/UL-map is needed (decision block 2724). If so, the algorithm 2700 returns to block 2702. Otherwise, the algorithm 2700 proceeds to a DSA request at block 2708. The algorithm 2700 also arrives to block 2708 if there is no switch to WLAN at decision block 2704 with WiMAX continuing at block 2706. From block 2708, the algorithm 2700 determines whether to switch to WLAN for the remainder of the s-frame (decision block 2710). If the switch occurs (decision block 2710), WLAN transmission/reception occurs at block 2712. Unless a switch is made to WiMAX (decision block 2714), WLAN transmission/reception continues at block 2712. If a switch is made to WiMAX (decision block 2714) or if a switch was never made to WLAN (decision block 2710), the algorithm 2700 proceeds with WiMAX operations at block 2716.

Figure 28:
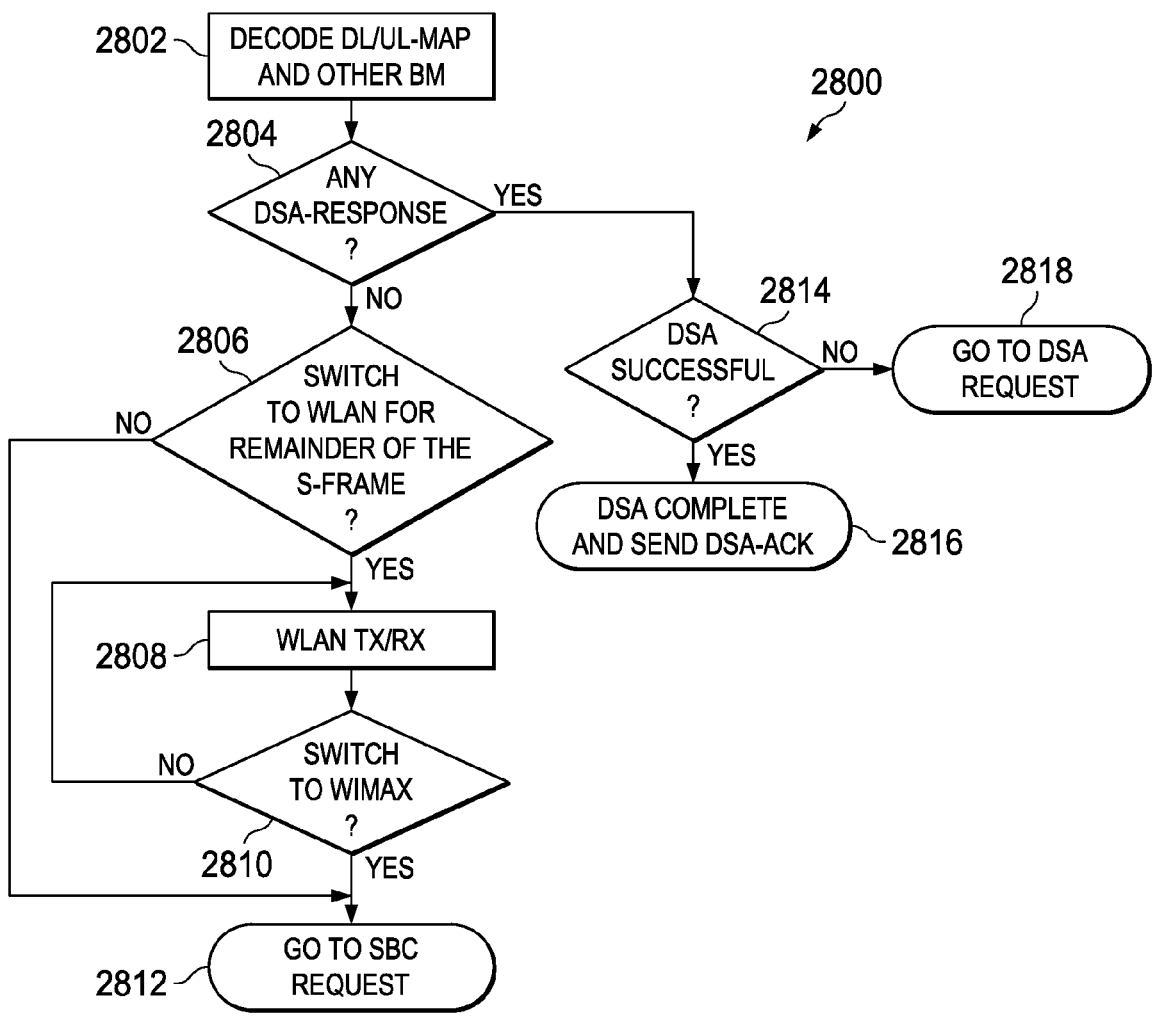
FIG. 28 illustrates an algorithm for an DSA response in accordance with embodiments.

FIG. 28 illustrates an algorithm 2800 for a DSA response in accordance with embodiments. As shown, the algorithm 2800 involves receiving and decoding a DL/UL-MAP and other BM (block 2802). At decision block 2804, the algorithm 2800 determines whether there is any DSA response. If so, the algorithm 2800 determines if the DSA is successful (decision block 2814). If the DSA is successful (decision block 2814), the DSA is complete and a DSA acknowledgement is sent (block 2816). Otherwise, the algorithm 2800 proceeds to a DSA request at block 2818 (e.g., the algorithm 2700 of FIG. 27).

If there is no DSA response (decision block 2804), the algorithm 2800 determines whether to switch to WLAN for the remainder of the s-frame (decision block 2806). If the switch occurs (decision block 2806), WLAN transmission/reception occurs at block 2808. Unless a switch is made to WiMAX (decision block 2810), WLAN transmission/reception continues at block 2808. If a switch is made to WiMAX (decision block 2810) or if a switch was never made to WLAN (decision block 2806), the algorithm 2800 proceeds to a DSA request at block 2812 (e.g., the algorithm 2700 of FIG. 27).

Figure 29:
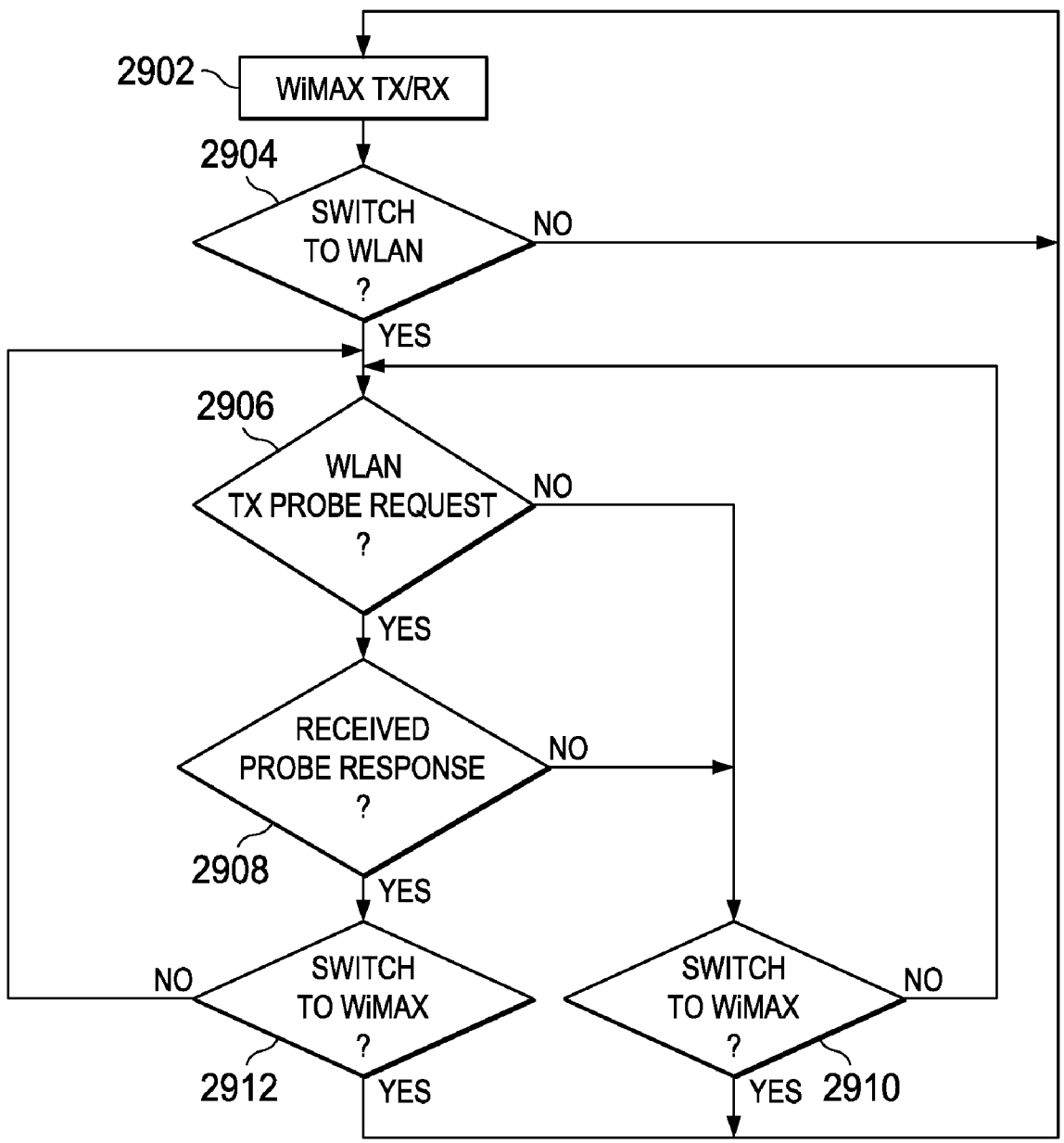
FIG. 29 illustrates an algorithm for active scanning in an WLAN network in accordance with embodiments.

FIG. 29 illustrates an algorithm 2900 for active scanning in a WLAN network in accordance with embodiments. The algorithm 2900 begins at block 2902 with WiMAX transmission/reception occurring until a switch to WLAN is made (decision block 2904). After switching, the algorithm 2900 determines if a WLAN probe request is transmitted (decision block 2906). If so, the algorithm 2900 determines whether a probe response is received (decision block 2908). The algorithm 2900 returns to decision blocks 2906 and 2908 until a switch to WiMAX is made (either of decision blocks 2910 or 2912).

Figure 30:
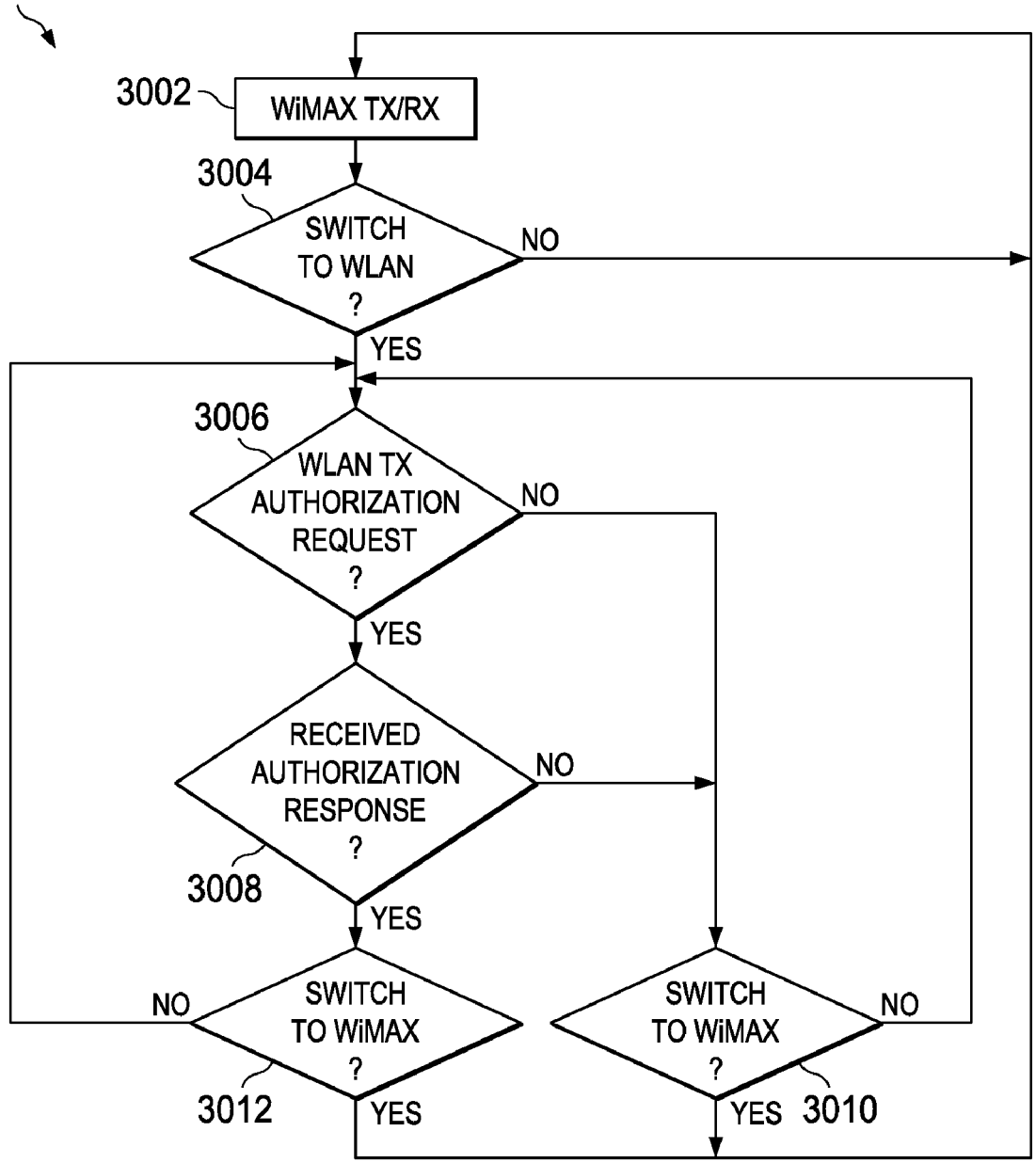
FIG. 30 illustrates an authentication algorithm for a WLAN network in accordance with embodiments.

FIG. 30 illustrates an authentication algorithm 3000 for a WLAN network in accordance with embodiments. The algorithm 3000 begins at block 3002 with WiMAX transmission/reception occurring until a switch to WLAN is made (decision block 3004). After switching, the algorithm 3000 determines if a WLAN authentication request is transmitted (decision block 3006). If so, the algorithm 3000 determines whether an authentication response is received (decision block 3008). The algorithm 3000 returns to decision blocks 3006 and 3008 until a switch to WiMAX is made (either of decision blocks 3010 or 3012).

Figure 31:
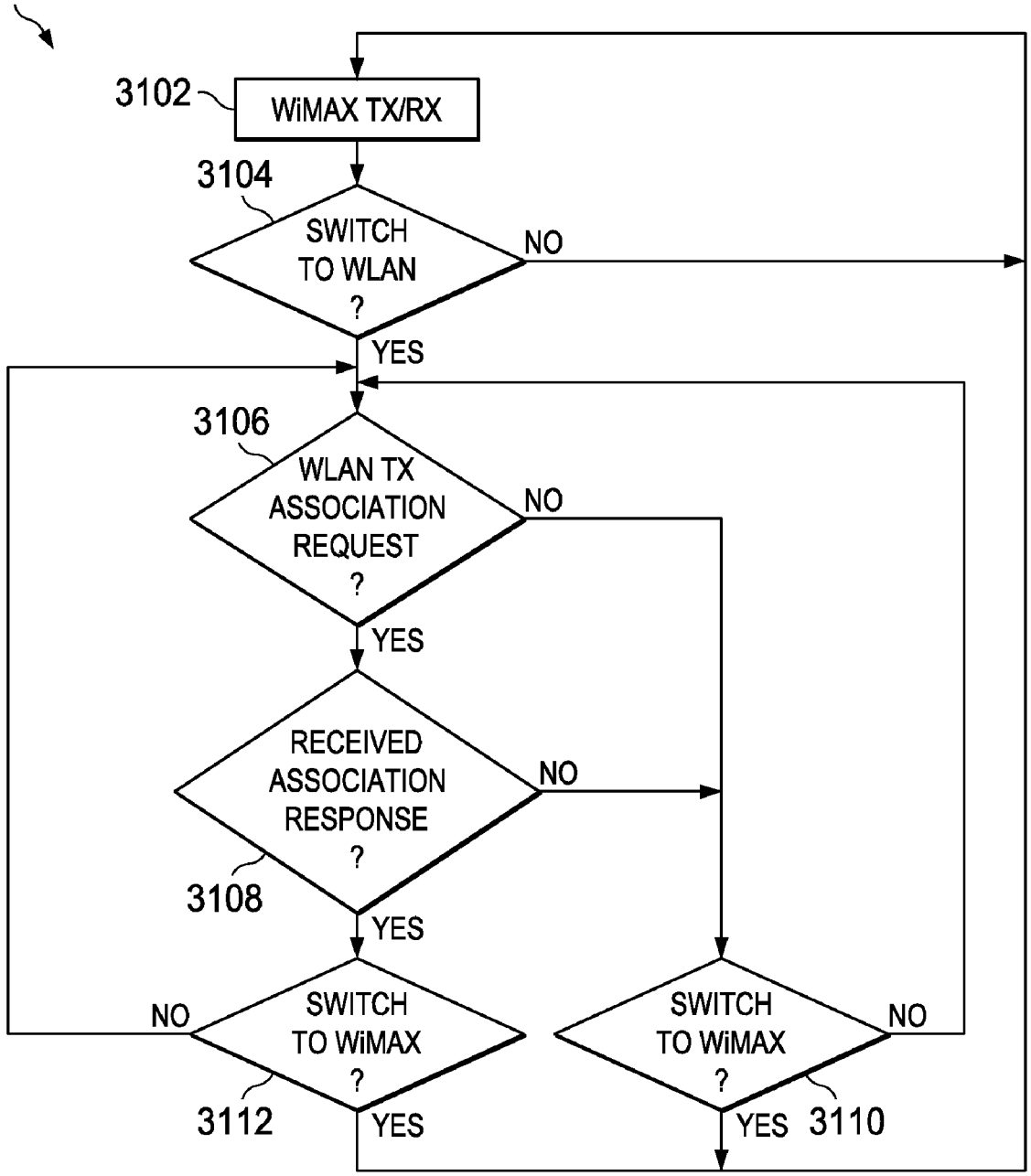
FIG. 31 illustrates an association algorithm for a WLAN network in accordance with embodiments.

FIG. 31 illustrates an association algorithm 3100 for a WLAN network in accordance with embodiments. The algorithm 3100 begins at block 3102 with WiMAX transmission/reception occurring until a switch to WLAN is made (decision block 3104). After switching, the algorithm 3100 determines if a WLAN association request is transmitted (decision block 3106). If so, the algorithm 3100 determines whether an association response is received (decision block 3108). The algorithm 3100 returns to decision blocks 3106 and 3108 until a switch to WiMAX is made (either of decision blocks 3110 or 3112).

Figure 32:
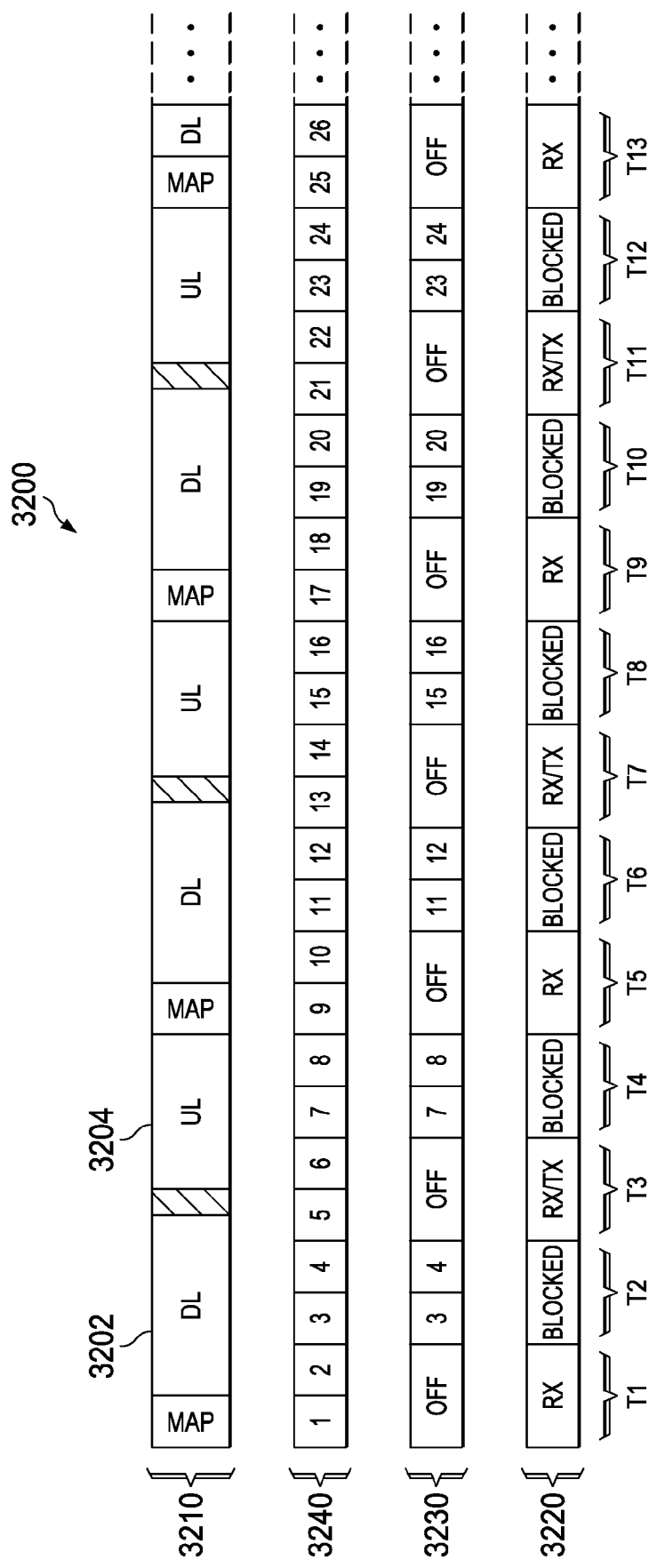
FIG. 32 illustrates a timing diagram showing Bluetooth (BT) and WiMAX coexistence in accordance with embodiments.

Although various embodiments have been directed to WiMAX/WLAN coexistence, other network technologies may additionally or alternatively coexist. For example, FIG. 32 illustrates a timing diagram 3200 showing BT and WiMAX coexistence in accordance with embodiments. In the timing diagram 3200, WiMAX frames 3210 comprise alternating downlink frames 3202 and uplink frames 3204. Meanwhile, BT slots 3240 are provided in sequence (1-26). In the timing diagram 3200, various BT operations 3230 and WiMAX operations 3220 correspond to different time periods T1-T13. In T1, T5, T9, and T13, WiMAX operations 3220 correspond to receptions while BT operations 3230 are "off". In T2, T4, T6, T8, T10, and T12, WiMAX operations 3220 are blocked while BT operations 3230 are active for the corresponding BT slots. In T3, T7, and T11, WiMAX operations 3220 correspond to transmissions and receptions while BT operations 3230 are "off".

Figure 33:
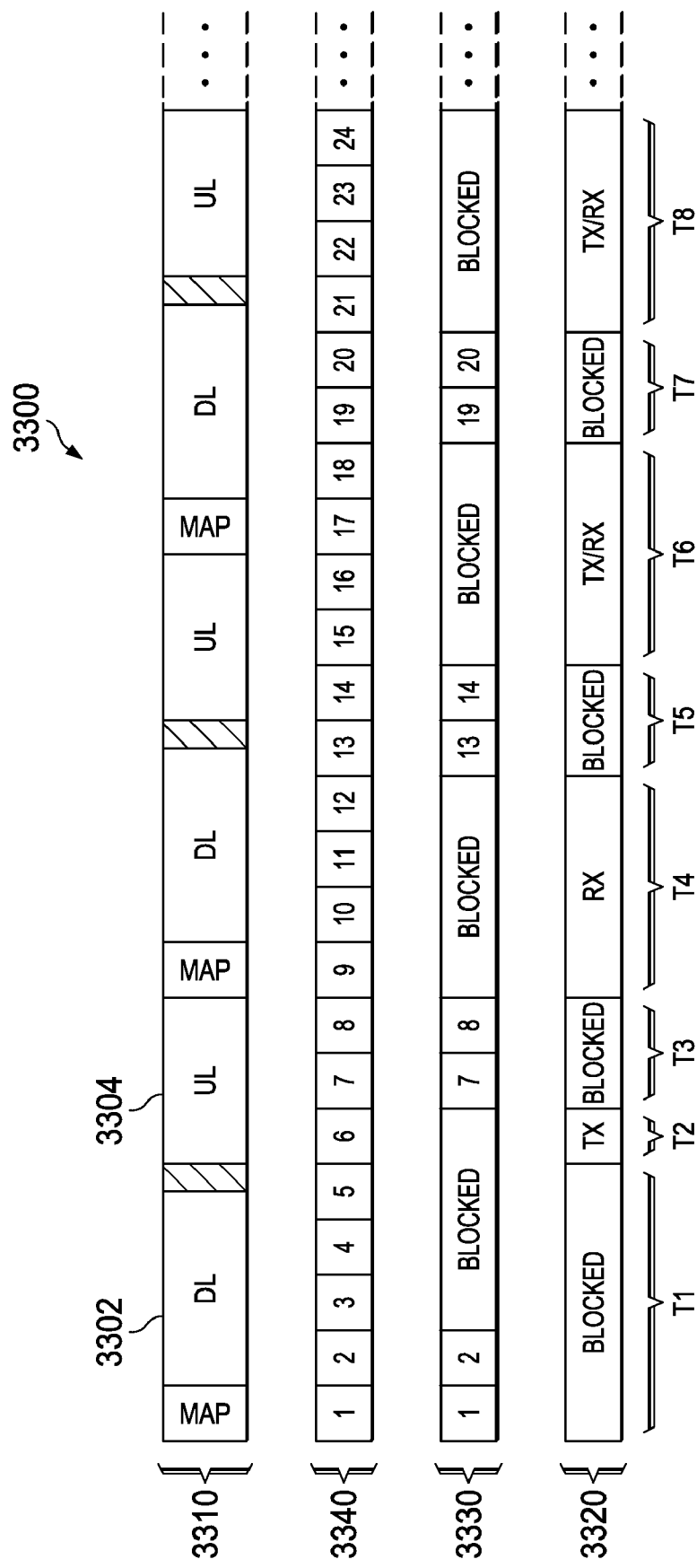
FIG. 33 illustrates another timing diagram showing BT and WiMAX coexistence in accordance with embodiments.

FIG. 33 illustrates another timing diagram 3300 showing BT and WiMAX coexistence in accordance with embodiments. In the timing diagram 3300, WiMAX frames 3310 comprise alternating downlink frames 3302 and uplink frames 3304. Meanwhile, BT slots 3340 are provided in sequence (1-24). In the timing diagram 3400, various BT operations 3330 and WiMAX operations 3320 correspond to different time periods T1-T8. In T2, WiMAX operations 3320 correspond to transmissions while BT operations 3330 are blocked. In T4, WiMAX operations 3320 correspond to receptions while BT operations 3330 are blocked. In T6 and T8, WiMAX operations 3320 correspond to transmissions and receptions while BT operations 3330 are blocked. In T1, T3, T5, and T7, WiMAX operations 3320 are blocked while BT operations 3330 are active for at least some of the corresponding BT slots 3340.

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. A communication device, comprising:
   a plurality of network technology subsystems, each subsystem associated with a different network technology; and
   a controller coupled to the plurality of network technology subsystems, the controller enables coexistence of the different network technologies in accordance with at least one monitored quality of service (QoS) parameter, wherein if the QoS parameter indicates that more than a threshold amount of interference exists between the different network technologies, the controller reduces transmission power for at least one of the network technologies and wherein, if said transmission power has been reduced by more than a threshold amount and if said QoS parameter indicates that more than a threshold amount of interference exists between different network technologies, the controller implements time multiplexing for the different network technologies.

2. The communication device of claim 1 wherein said QoS parameter comprises a packet error rate (PER).

3. The communication device of claim 1 wherein the controller monitors and ranks traffic flows associated with the different network technologies.

4. The communication device of claim 1 wherein the controller supports coexistence of the different network technologies based on a unified set of synchronization parameters associated with the different network technologies.

5. The communication device of claim 1 wherein the controller selects traffic provisioning and power saving parameters associated with the different network technologies.

6. The communication device of claim 1 wherein the network technology subsystems comprise a Worldwide Interoperability for Microwave Access (WIMAX) subsystem and a Wireless Local Area Network (WLAN) subsystem.

7. A method for communications, comprising:
   monitoring at least one quality of service (QoS) parameter;
   enabling coexistence of different network technologies in accordance with the at least one monitored QoS parameter, wherein said enabling coexistence of different network technologies comprises reducing transmission power of a transmitter for at least one of the different network technologies if the QoS parameter indicates that more than a threshold amount of interference exists between the different network technologies and wherein said enabling coexistence of different network technologies comprises implementing time multiplexing for the different network technologies if said transmission power of said transmitter has been reduced by more than a threshold amount and if said QoS parameter indicates that more than a threshold amount of interference exists between the different network technologies.

8. The method of claim 7 wherein said enabling coexistence of different network technologies comprises monitoring and ranking traffic flows associated with the different network technologies.

9. The method of claim 7 wherein said enabling coexistence of different network technologies comprises maintaining synchronization based on a unified set of synchronization parameters associated with the different network technologies.

10. The method of claim 7 wherein said enabling coexistence of different network technologies comprises controller selecting traffic provisioning and power saving parameters associated with the different network technologies.

11. The method of claim 7 further comprising controller maintaining coexistence of different network technologies in accordance with power save parameters for at least one of the different network technologies.

12. A communications network, comprising:
    at least one technology network; and
    a device having at least two network technology subsystems onboard, each subsystem associated with a different network technology, and the device further comprising:
      a controller coupled to the subsystems, wherein the controller enables coexistence of the different network technologies in accordance with at least one monitored quality of service (QoS) parameter, wherein, if the QoS parameter indicates that more than a threshold amount of interference exists between the different network technologies, the controller selectively reduces transmission power for at least one of the network technologies and if said transmission power has been reduced by more than a threshold amount, the controller selectively implements time multiplexing for the different network technologies.

13. The communications network of claim 12 wherein the network technology subsystems comprise a Worldwide Interoperability for Microwave Access (WIMAX) subsystem and a Wireless Local Area Network (WLAN) subsystem.

14. The communication network of claim 12 wherein the controller,
    monitors and ranks traffic flows associated with the different network technologies; and
    maintains synchronization based on a unified set of synchronization parameters associated with the different network technologies.

* * * * *